June 1, 1954  J. GROSVALET ET AL  2,679,975
AUTOMATIC BINARY CALCULATING MACHINE
FOR MATRICIAL CALCULATION Filed May 7, 1948  17 Sheets-Sheet 1

JEAN GROSVALET AND
JEAN SIMON-SUISSE

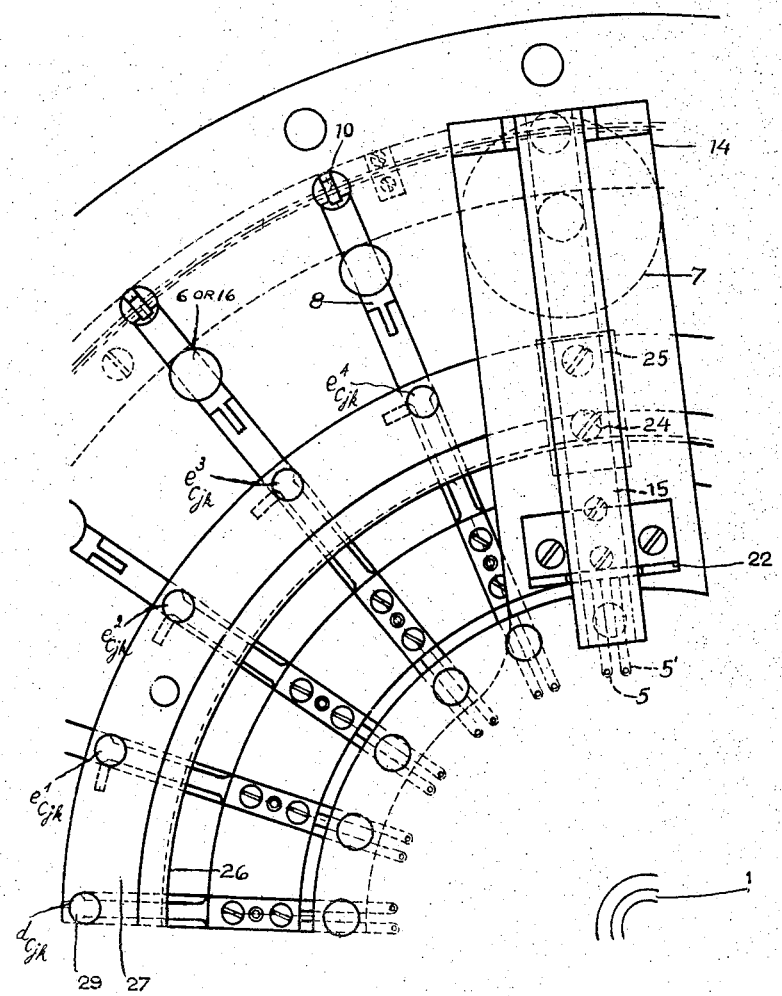

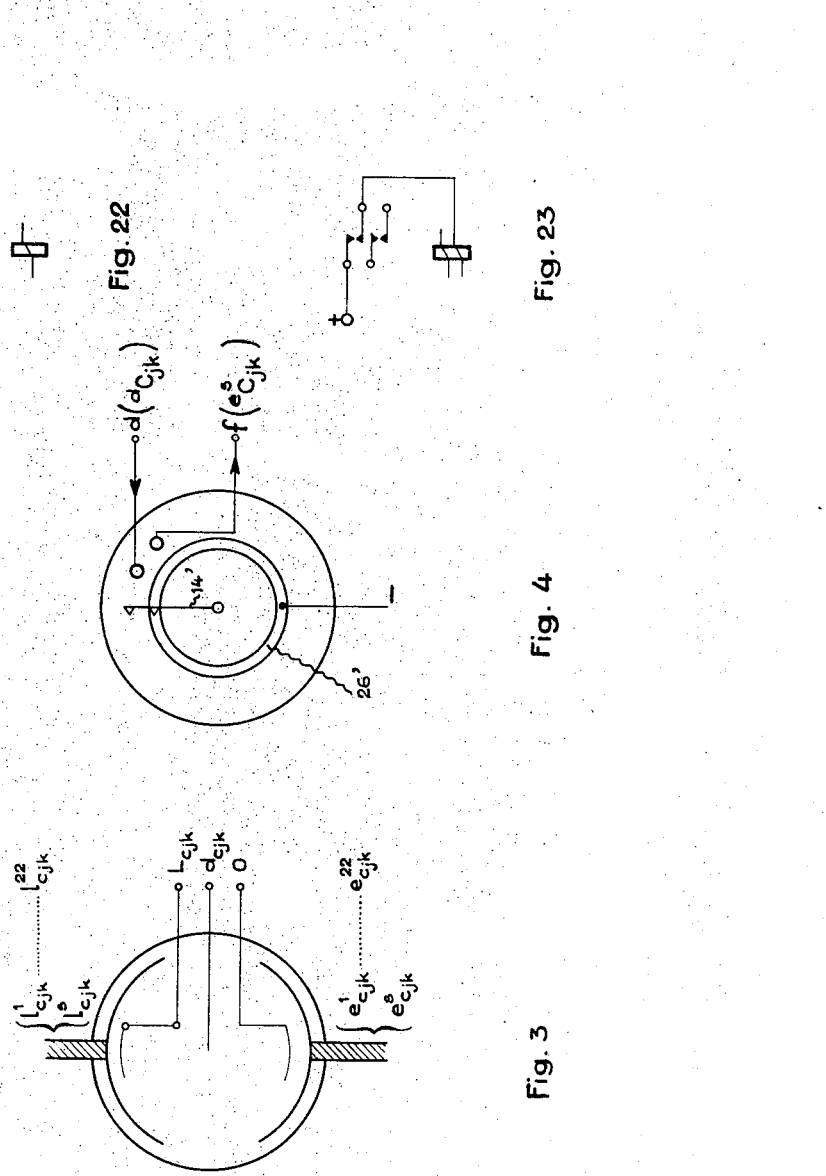

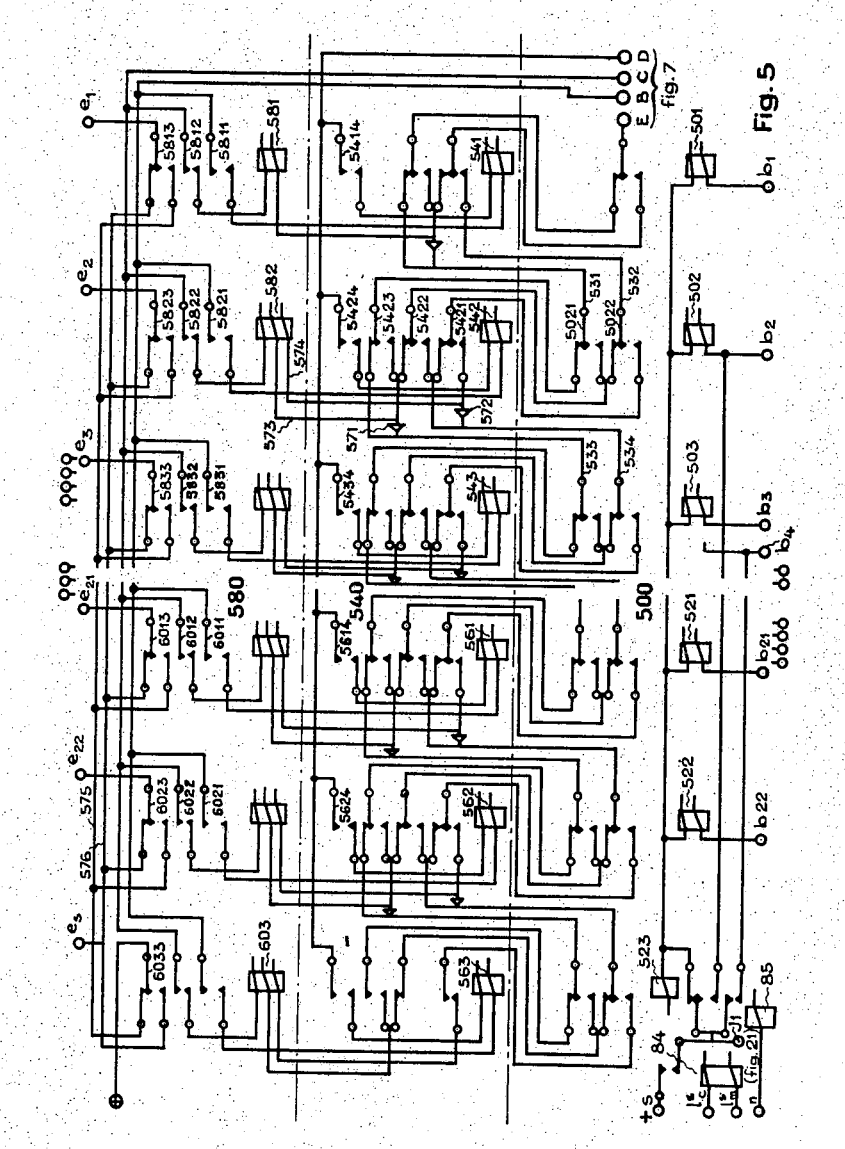

June 1, 1954 J. GROSVALET ET AL 2,679,975
AUTOMATIC BINARY CALCULATING MACHINE
FOR MATRICIAL CALCULATION
Filed May 7, 1948 17 Sheets-Sheet 7

INVENTORS
JEAN GROSVALET
JEAN SIMON-SUISSE
BY

ATTORNEYS

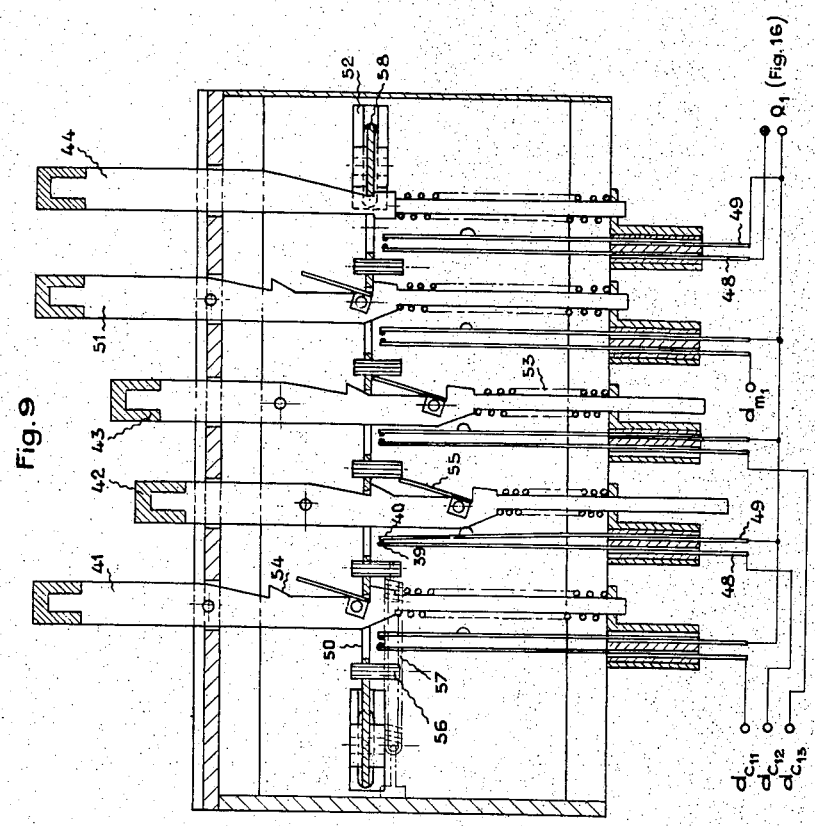

June 1, 1954
J. GROSVALET ET AL
2,679,975
AUTOMATIC BINARY CALCULATING MACHINE FOR MATRICIAL CALCULATION
Filed May 7, 1948
17 Sheets-Sheet 9
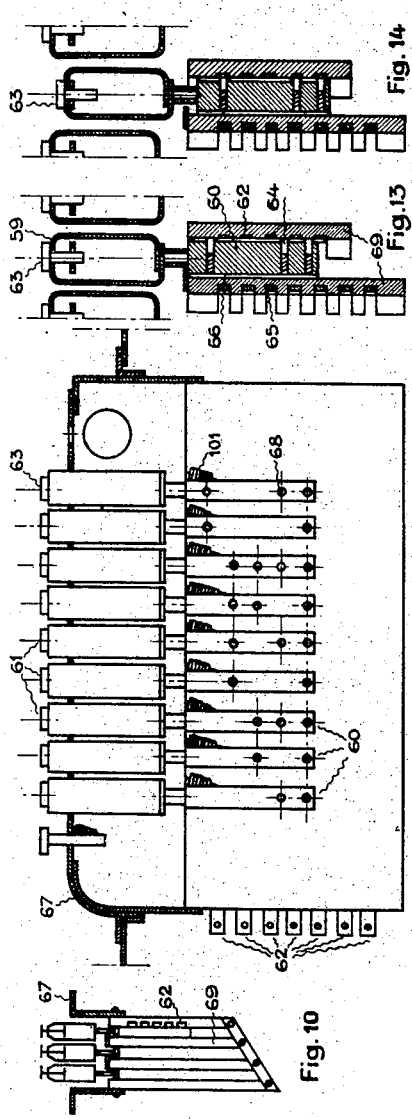
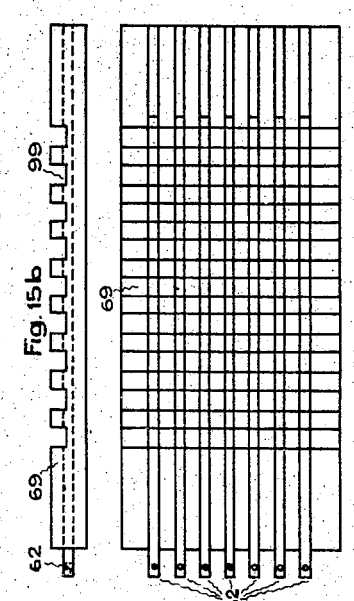
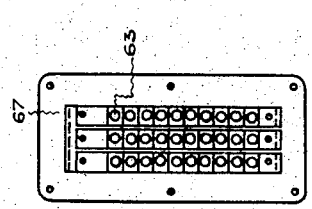
INVENTORS
JEAN GROSVALET
JEAN SIMON-SUISSE
BY
ATTORNEYS

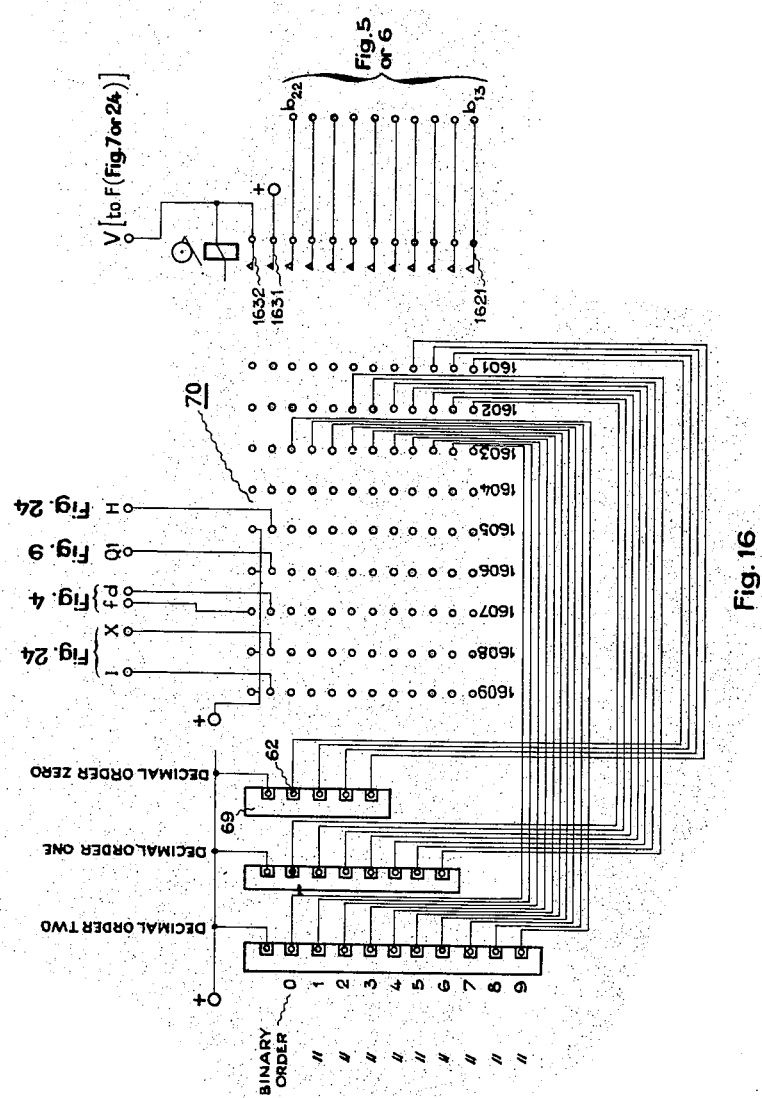

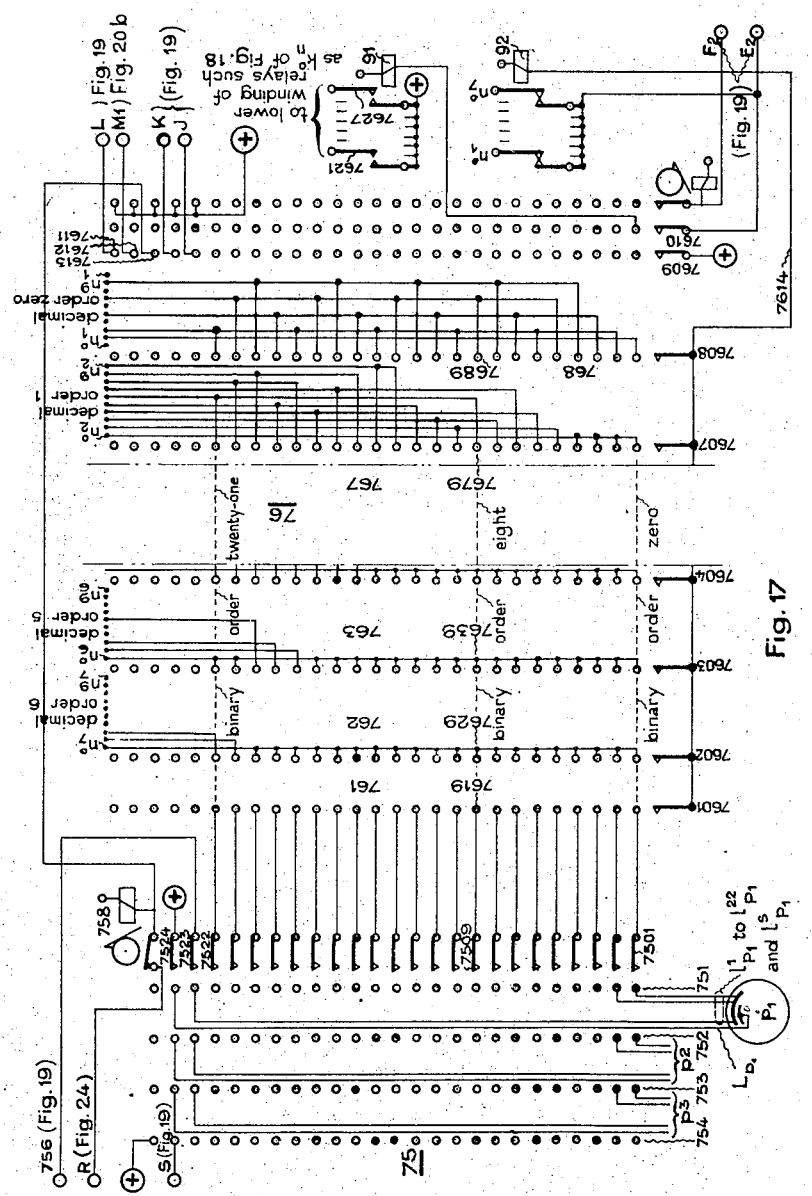

June 1, 1954
J. GROSVALET ET AL
2,679,975
AUTOMATIC BINARY CALCULATING MACHINE
FOR MATRICIAL CALCULATION
Filed May 7, 1948
17 Sheets-Sheet 12
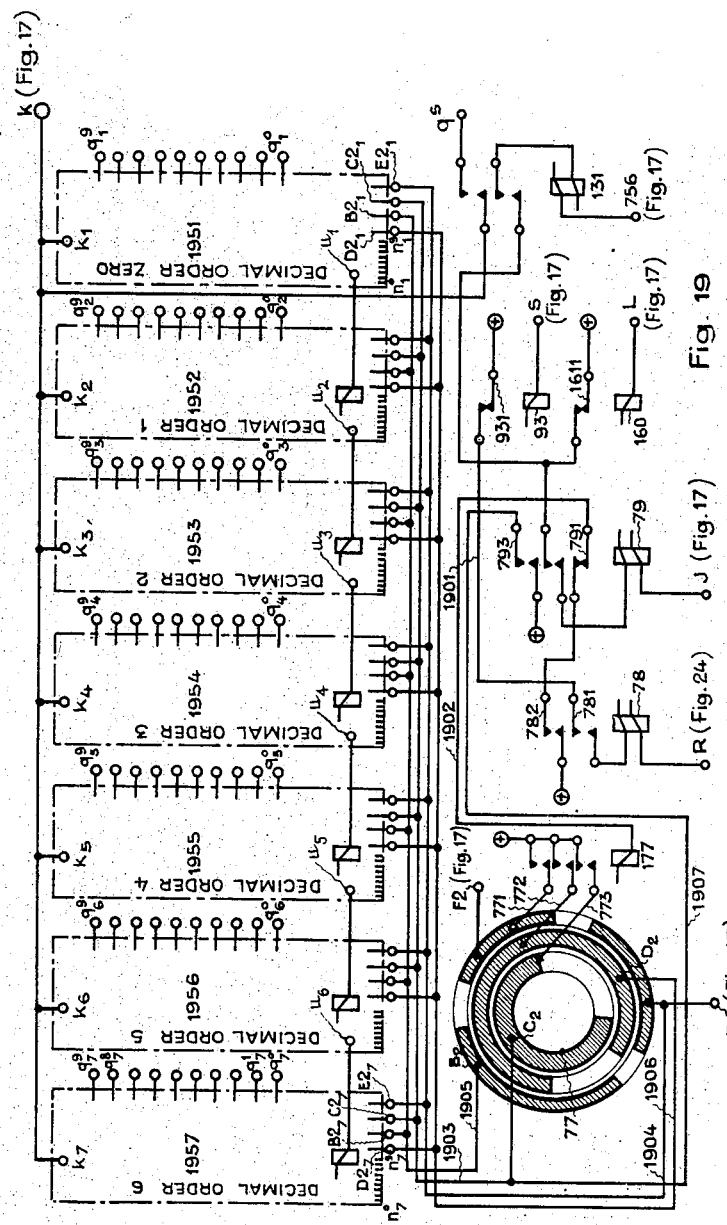
JEAN GROSVALET AND
JEAN SIMON-SUISSE June 1, 1954
J. GROSVALET ET AL
2,679,975
AUTOMATIC BINARY CALCULATING MACHINE
FOR MATRICIAL CALCULATION
Filed May 7, 1948
17 Sheets-Sheet 14
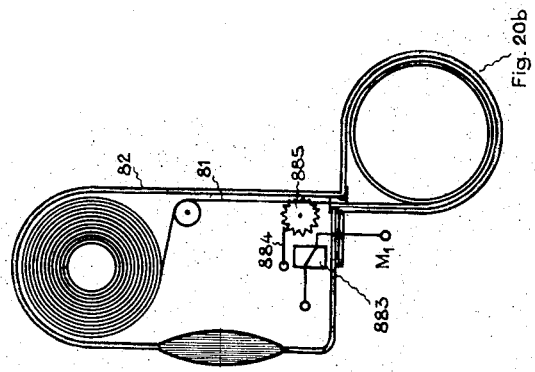
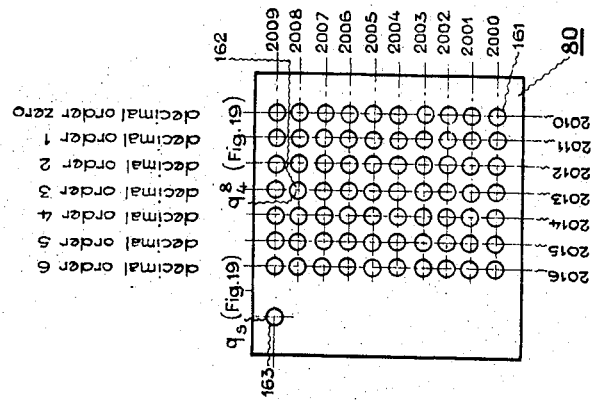
INVENTORS
JEAN GROSVALET
JEAN SIMON-SUISSE
BY
ATTORNEYS

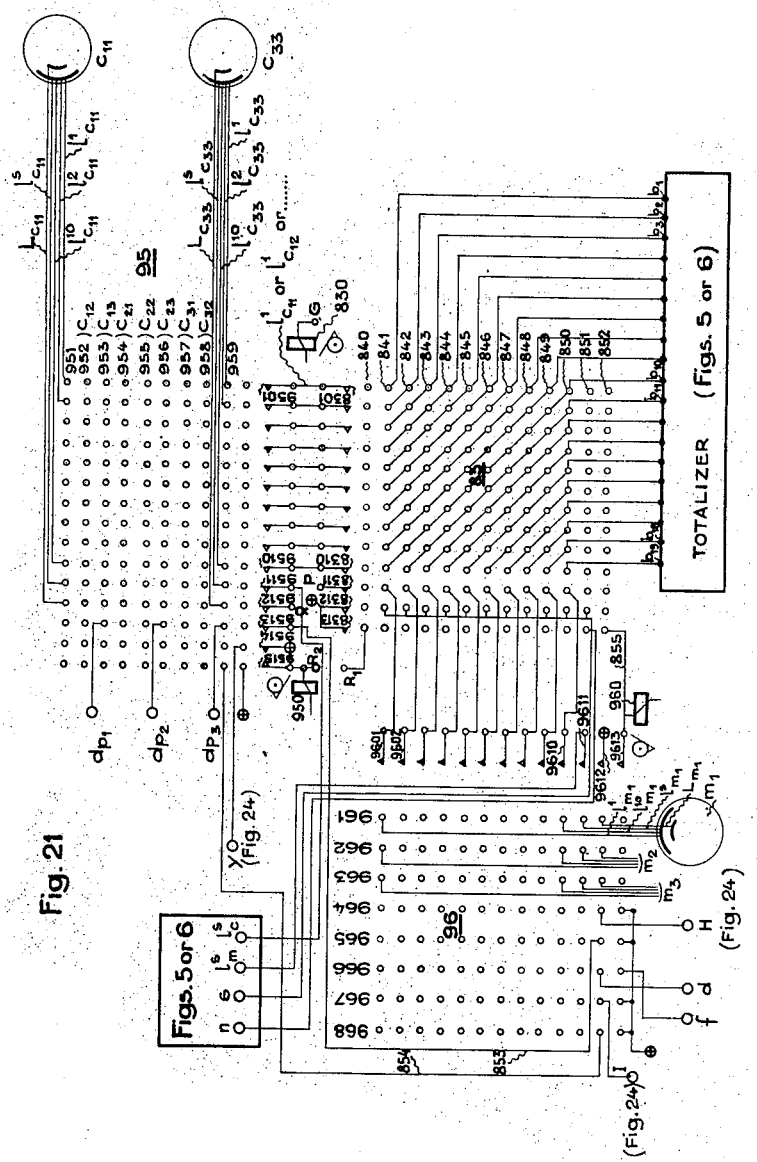

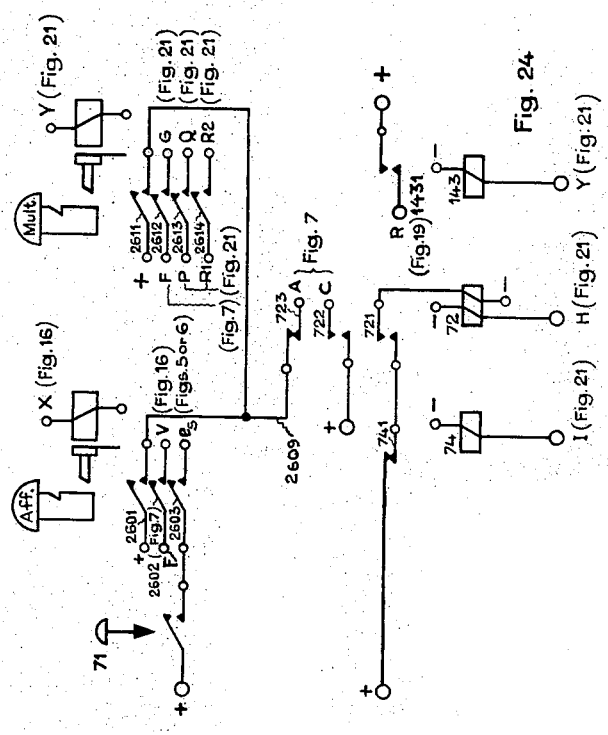

Patented June 1, 1954

2,679,975

UNITED STATES PATENT OFFICE 2,679,975

AUTOMATIC BINARY CALCULATING MACHINE FOR MATRICIAL CALCULATION

Jean Grosvalet, Anbony, and Jean Simon-Suisse, Douala, France, assignors to Office National d'Etudes et de Recherches Aeronautiques, Paris, France, a corporate body of France Application May 7, 1948, Serial No. 25,696

Claims priority, application France May 14, 1947

3 Claims. (Cl. 235—61)

Our invention relates to a calculating machine for matricial calculation and particularly to a machine adapted to multiply automatically a matrix by a column matrix.

An object of our invention is to provide a calculating machine adapted to sum up two or several algebraic numbers.

Another object of our invention is to provide a calculating machine adapted to translate decimal data into binary data.

Another object of our invention is to provide a calculating machine adapted to multiply two or several algebraic numbers.

Another object of our invention is to provide a calculating machine adapted to multiply a matrix by a column matrix.

Another object of our invention is to provide a calculating machine adapted to translate binary results into decimal results.

Before disclosing the calculating machine and the structure of the units, which when suitably associated, may perform such operations, it is desirable to recall to mind the rules of multiplication of a matrix by a column matrix.

A square matrix of order $n$ is an array of $n^2$ values arranged in columns and in rows and termed the elements. For instance $$\begin{bmatrix} 3 & 2 & 1 \\ 2 & 5 & 6 \\ 8 & 2 & 3 \end{bmatrix}$$

is a square matrix of third order.

We will designate a square matrix by the symbol [M], the general element of this matrix being $a_{jk}$ ($j$ being the number of the row, and $k$ the number of the column).

A column matrix is constituted by a single column; for instance $$\begin{bmatrix} 7 \\ 5 \\ 1 \end{bmatrix}$$

is a column matrix which we will call hereinafter more simply a column. We will designate a column by the symbol [Y], the general element of this column being $y_j$ ($j$ being the number of the row).

The product of a matrix [M] by a column [Y] is a column [C] the elements of which are formed by the rule $$c_j = \sum_{l}^{n} a_{jk} y_k$$

Example:

$$\begin{bmatrix} 3 & 2 & 1 \\ 2 & 5 & 6 \\ 8 & 2 & 3 \end{bmatrix} \times \begin{bmatrix} 7 \\ 5 \\ 1 \end{bmatrix} = \begin{bmatrix} 21+10+1 \\ 14+25+6 \\ 56+10+3 \end{bmatrix} = \begin{bmatrix} 32 \\ 45 \\ 69 \end{bmatrix}$$

The foregoing and other objects of our invention will clearly appear in the following detailed description when studied in connection with the accompanying drawings, wherein:

Figs. 1 and 2 represent a number indicator for the storage of binary data and results;

Fig. 3 represents an idealized number indicator;

Fig. 4 represents an idealized revolution counter used in the machine;

Figs. 5 and 6 represent the totalizer of the machine;

Figs. 8 and 9 represent the positioning keyboard for data location;

Figs. 10, 11, 12, 13, 14, 15a, 15b and 15c represent the posting key-board and decimal-binary data transformer for data storage;

Fig. 16 represents partially the decimal binary transformer;

Figs. 17, 18 and 19 represent the binary decimal results transformer;

Fig. 20 represents the decimal results registering means;

Fig. 21 represents the matrix-matrix-column multipler circuit;

Figs. 22 and 23 represent symbolised relays;

Fig. 24 represents the machine control means;

*Number indicator of a binary number (Figs. 1, 2, 3)*

A number indicator comprises a plurality of open or closed contacts, each of said contacts symbolizing a digit of a binary order of the number stored in said number indicator. In order to utilize said number in the machine, current is sent unto the common input of said contacts; said number is then symbolized by the presence or absence of current in conductors connected to the outputs of these contacts.

Figure 1:
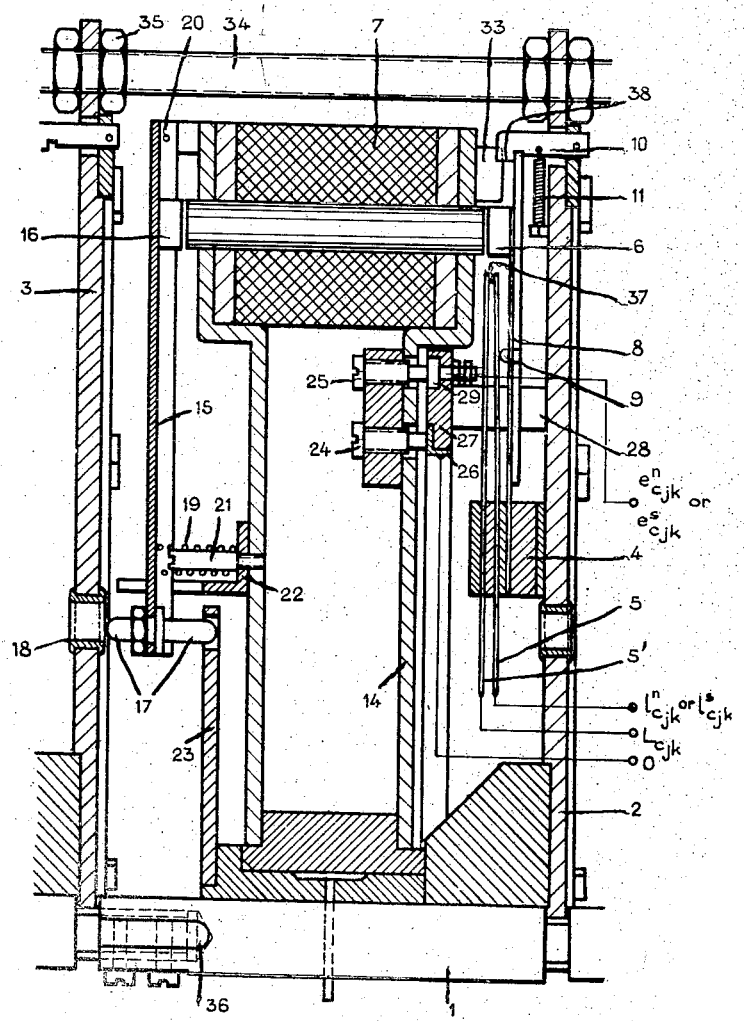

In Figs. 1 and 2, shaft 1 is continuously driven by a motor group not shown. On said shaft are mounted flanges 2 and 3 forming the bearing of the shaft. Shaft 1 is composed of jointed sections allowing easy dismantling. Flange 2 bears, by means of a circular crown 4, 41 pairs of blades 5 furnished with contact points 37. The function of said 41 pairs of blades is the registering of 40 binary digits and of the algebraic sign of the binary number formed by said digits.

The contact points 37 of blades 5 and 5' are not normally on contact; said contact is established when armature 6 has been attracted by electromagnet 7. Armature 6 is rigidly fixed on blade 8 carried by crown 4 and comprising a stud 9 designed to cause the bending of blade 5. Armature 6 being attracted, catch 10, forced back by spring 11, holds armature 6 in this position. Catch 10 is provided with a projection portion 38 which prevents armature 6 from making contact with the core of electro-magnet 7.

Electro-magnet 7, rigidly fixed on arm 14 mounted free on shaft 1 is normally stationary. Bar 15 which is U shaped, is pinned at 20 on arm 14 and carries an armature 16, and a double projection finger 17. Said double projection finger sinks into a recess provided to this effect in flange 3 when the number indicator is at rest. Said recess is lined with a rubber ring 18. Projection finger 17 is maintained in aforementioned recess by pressure of spring 19 centered and supported by screw 21 securing guide 22 of bar 15.

Plate 23, comprising circular recesses on the same radius as projection finger 17, is continuously driven by shaft 1 by means of a pin. The electro-magnet terminals are connected to brushes 24 and 25 rigidly fixed up on arm 14. Brush 24 wipes circular conductive crown 26. rigidly fixed on insulating crown 27 secured to flange 2 by three standards 28.

Crown 27 comprises 24 pins 29 having between them the same angular distance as the blades 5, 5' and 8, the position of a pin 29 being such that, in relation to the geometric dimensions of the number indicator, when brush 25 is in front of a given pin 29, the core of electro-magnet 7 is in front of armature 6 of the corresponding blade 8. Among the aforementioned 24 pins, 22 serve for registering binary digits, one for registering the algebraic sign of the binary number formed by said binary digits, the last pin in front of the rest position is a starting pin. No group of blades 5, 5' and 8 corresponds to said starting pin since it has been shown that the number of said groups of blades is 41.

It is evident that if the registering of binary numbers composed of $n$ binary digits is concerned, crown 27 will have $n+2$ pins 29 and flange 2 $n+1$ groups of blades 5, 5' and 8.

In the inoperative position, projection finger 17 sinks into the rubber lined recess 18 and brush 25 is in front of starting pin 29. The sending of an electric current impulse on starting pin 29 causes armature 16 to be attracted by the electromagnet core. It will be noted that in the inoperative position there is no armature 6 at the other side of electro-magnet 7. Projection finger 17 sinks into one of the recesses of plate 23 and consequently drives arm 14 in rotation with itself. Brush 25 wipes successively all pins 29 and, depending on whether said pins are provided with current or not, electro-magnet 7 attracts or not corresponding armatures 6 which close or not the contacts of blades 5 and 5'. Projection 33 raises each of catches 10 before electro-magnet 7 is in front of the corresponding blades which has for effect the opening of the contact that may have been closed during the preceding rotation. When the driven mechanism has made a revolution, projection finger 17 is again in front of recess 18 and, since no impulse is applied to the starting pin, the mechanism becomes stationary as armature 16 is no longer attracted. It will be noted that flange 3 performs the function of flange 2 for the preceding number indicator, and flange 2 that of flange 3 for the following number indicator.

The number indicators are mounted by group on the same axis, and the flanges are rigidly fixed by a system of three threaded rods 34, provided with nuts 35 securing said flanges and allowing, in conjunction with joints 36 of shaft 1, the removal of a number indicator from a group without dismantling the others.

Symbolization of number indicators

For the following part of the present description it is essential to be able to symbolize a number indicator. This symbolization is represented on Fig. 3. A number indicator for the storage of the element $a_{jk}$ of the matrix is designated by the notation $C_{jk}$. All blades 5, 5' of number indicator $C_{jk}$ are connected in parallel to binding post $L_{Cjk}$.

The outgoing lead of a registering blade 5 terminates on binding post $l^n{}_{Cjk}$, the index $n$ denoting the binary order of the digit in the binary number registered. The binding post for the sign is designated by $l^s{}_{Cjk}$.

The input binding post of crown 26 is binding post O and is assumed in the following description as permanently connected to the negative pole of the battery. Starting pin 29 is connected to binding post $d_{Cjk}$.

The input binding post of a pin 29 is $e^n{}_{Cjk}$ for the recording of a binary digit and $e^s{}_{Cjk}$ for the recording of the sign.

In short a number indicator has 24 input binding posts, $e^1{}_{Cjk}$ to $e^{22}{}_{Cjk}$ for recording of 22 binary digits, $e^s{}_{Cjk}$ for recording of the sign, $d_{Cjk}$ for starting the recording operation and 24 output binding posts $l^1{}_{Cjk}$ to $l^{22}{}_{Cjk}$ for transmitting of 22 binary digits, $l^s{}_{Cjk}$ for transmitting of the sign, $L_{Cjk}$ for starting the transmitting operation. O is a permanent feeding binding post. It should be noticed that the recording operation is of the series type and the transmitting operation of the parallel type.

The recording of a number on a number indicator is effected in the following manner:

Currents symbolizing binary digits (presence of current for the digit 1, absence of current for digit 0) arrive or not on pins $e^1{}_{Cjk}$ to $e^{22}{}_{Cjk}$ and the current symbolizing the sign (presence of current for sign —; absence of current for sign +) arrives or not on pin $e^s{}_{Cjk}$ reserved for the sign. By sending a starting impulse to the pin connected to binding post $d_{Cjk}$ there is thereby caused the rotation of electro-magnet 7 and this electro-magnet is energized or not according to whether brush 25 wipes a pin 29 fed with current or not, and consequently closes or not the corresponding contact 5—5'.

The transmitting of the number recorded on the number indicator will be performed by feeding with current binding post $L_{Cjk}$. A current appears on terminal $l^n{}_{Cjk}$ if the digit of binary order $n$ of the number stored is 1 and no current will appear if the digit of binary order $n$ of the number stored is 0.

Figure 25:
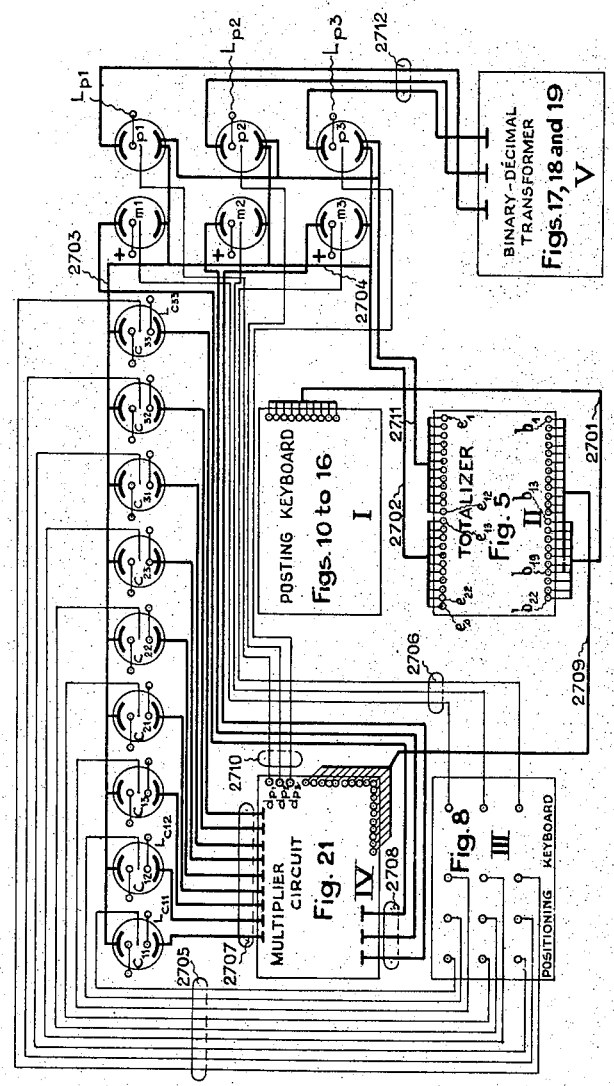
Fig. 25 represents the block-diagram of the machine.

Block diagram of the machine (Fig. 25)

In the example chosen for the description of its general functioning, the machine comprises:

Nine number indicators termed $C_{11}$, $C_{12}$, $C_{13}$, $C_{21}$, $C_{22}$, $C_{23}$, $C_{31}$, $C_{32}$, $C_{33}$ for the storage of elements $a_{11}$, $a_{12}$, $a_{13}$, $a_{21}$, $a_{22}$, $a_{23}$, $a_{31}$, $a_{32}$, $a_{33}$ of a matrix of the third order.

Three number indicators termed $m_1$, $m_2$, $m_3$ for the storage of elements $y_1$, $y_2$, $y_3$ of a three elements column-matrix. The input terminals of said number indicators are designated by $e^1{}_{mj}$ to $e^{22}{}_{mj}$, $e^s{}_{mj}$ and $d_{mj}$ and the output terminals by $l^1{}_{mj}$ to $l^{22}{}_{mj}$, $l^s{}_{mj}$ and $L_{mj}$ wherein $j=1, 2, 3$.

Three number indicators termed $p_1$, $p_2$, $p_3$ for the storage of the elements of the product $[C]=[M][Y]$. The input terminals of said number indicators are designated by $e^1{}_{pj}$ to $e^{22}{}_{pj}$, $e^s{}_{pj}$ and $d_{pj}$ and the output terminals by $l^1{}_{pj}$ to $l^{22}{}_{pj}$, $l^s{}_{pj}$ and $L_{pj}$ wherein $j=1, 2, 3$.

Fig. 25 relates to number indicators $C_{jk}$ and $m_j$ of a capacity of ten binary orders plus a sign and number indicators $p_j$ of a capacity of 22 binary orders plus a sign.

Referring again to Fig. 25, I (see Figs. 10 to 16) designates a posting keyboard on which are posted, in the decimal base, the matrix and column-matrix data. The ten outputs of the posting keyboard are connected, through leads 2701, to the input terminals $b_{13}$ to $b_{22}$ of totalizer II (see Figs. 5 or 6). Posting keyboard I, associated with totalizer II, transforms the decimal data into binary data which become available upon terminals $e_{12}$ to $e_{22}$ of totalizer II. These terminals are connected in parallel to input terminals of number indicators $C_{11}$ to $C_{33}$ and $m_1$, $m_2$, $m_3$, through leads 2702, 2703, 2704.

A positioning keyboard III (see Fig. 8) directs the binary data available at the output of totalizer II towards one of the number indicators $C_{11}$ to $C_{13}$ and $m_1$, $m_2$, $m_3$. It comprises twelve keys, corresponding to the twelve number indicators and is connected through leads 2705 and 2706 to the starting terminals of said number indicators. It sends an impulse to the chosen number indicator upon which the binary data is stored.

A multiplier circuit IV (see Fig. 21) has two inputs, the first connected to the outputs of the matrix data number indicators $C_{11}$ to $C_{33}$ through leads 2707, the second connected to the outputs of the column-matrix data number indicators $m_1$, $m_2$, $m_3$ through leads 2708. Circuit IV has two outputs, the first comprising 19 terminals which are connected, through leads 2709, respectively to input terminals $b_1$ to $b_{19}$ of totalizer II, the second comprising three terminals which are connected, through leads 2710, to the starting terminals $d_{p1}$, $d_{p2}$, $d_{p3}$ of number indicators $p_1$, $p_2$, $p_3$. The product elements appear successively on output terminals $e_1$ to $e_{22}$ and $e_s$ of totalizer II which are connected in parallel, through leads 2702 and 2711, to the input of number indicators $p_1$, $p_2$, $p_3$. Circuit IV sends successive impulses to $d_{p1}$, $d_{p2}$, $d_{p3}$ and $p_1$, $p_2$, $p_3$ successively store the elements of the product-column.

A binary-decimal transformer V (see Figs. 17, 18 and 19) transforms in the decimal base, the product elements stored upon number indicators $p_1$, $p_2$, $p_3$. It is connected to the output of said binary number indicators through leads 2712.

It should be noticed that the number indicators are connected in parallel to the output terminals of totalizer II. This arrangement has no inconvenience since the result is only stored upon the number indicator (s) which makes a revolution after the result has become available and before it is erased.

*Algebraic sum of two or several binary numbers*

Following is a description of the algebraic adding operation of several binary numbers, which is one of the basic operations in the machine, and which will be explained by reference to the summing of any quantity of positive or negative binary numbers, the sum of which does not exceed 22 binary digits maximum.

Fig. 5 is the wiring diagram of a plurality of relays forming three registers 500, 540 and 580.

In each register, the place of a relay corresponds to the order of a binary digit; for example, relays 502, 542 and 582 correspond to binary order 1 (second digit from right). The position of the blades correspond to the value of the digit, 0 when the relay is off, 1 when the relay is on. Figs. 22 and 23 are the symbols of such relays. Fig. 22 shows a single winding relay. Fig. 23 represents a "memory" relay with two windings, the lowest one being the holding winding. The terminal of a relay shown free on a diagram is supposed to be connected to the negative terminal of the battery.

Figure 7:
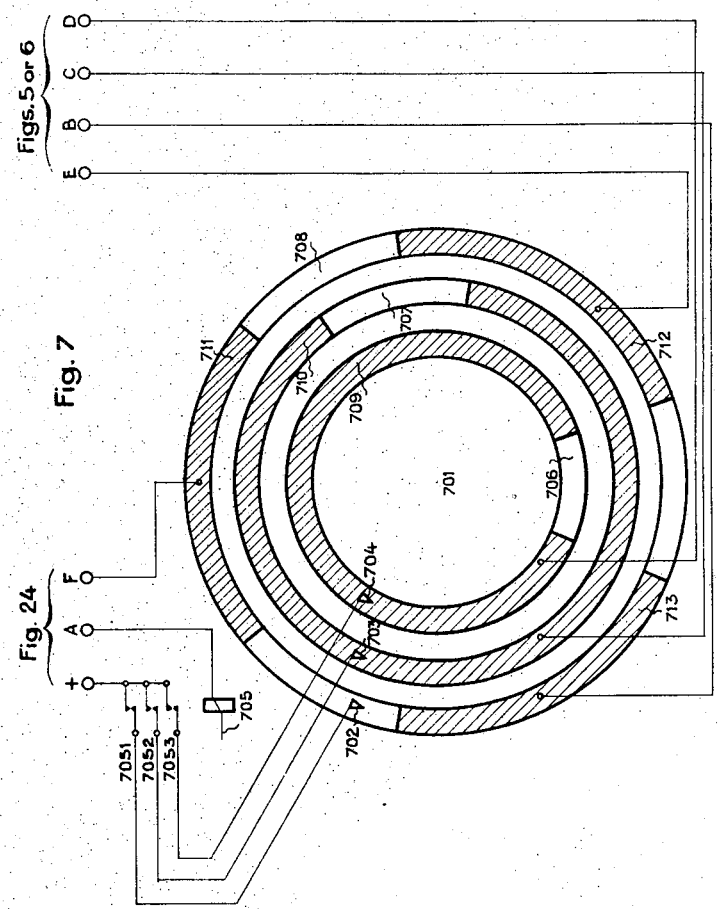
Fig. 7 represents the rotative commutator associated with the totalizer.

Commutator 701 of Fig. 7 controls the operations in said registers 500, 540 and 580. The first action of this commutator is to allow one binary number to be recorded on register 500. The plurality of currents representing this number (one current for digit 1, no current for digit 0) is sent to terminals $b_1$ to $b_{19}$ or $b_{13}$ to $b_{22}$ as shown in Figs. 5 and 25, and energizes or not corresponding relays 501 to 522.

On register 540 is recorded another binary number which is 0 at the beginning of the adding operation.

The next action of commutator 701 is to send a current in terminal E of Fig. 5, which current will trigger the adding operation, the sum being recorded on register 580.

Then, the further action of commutator 701 is to transfer the sum from upper register 580 to medium register 540 and to rub out the number recorded on register 500 which is now ready for receiving the next number to be added. The cycle, so terminated, begins again.

Finally, the last result is recorded on terminals $e_1$ to $e_{22}$ of upper register 580.

The adding operation itself will now be explained in details. To positive numbers to be added are supposed to be recorded on registers 500 and 540 respectively. On Fig. 5, each column of relays corresponds to a definite order of the digits of the numbers recorded.

Now, let us see what happens when the adding operation is triggered by a current applied on terminal E. This current runs from right to left and reaches column of relays 502, 542 and 582, chosen for detailed explanations, by lead 531 or 532 according to the absence or the presence of carry over from the preceding column.

*1st case.*—The digits recorded on 502 and 542 are 0 and 0 and there is no carry over coming from the preceding column.

Relays 502 and 542 are de-energised; according to the absence of carry over, current applied on terminal E comes by 531 from the preceding column, goes through relay 502 by blade 5021 off, through relay 542 by blade 5423 off and leaves the column by lead 533. Rectifier 571 prevents said current from energising medium winding of upper relay 582 through lead 573. The result recorded on this column of register 580 is therefore 0 and the following column is subjected to the same condition as the column heretofore mentioned, arrival of current by lead 533 characterising absence of carry over.

*2nd case.*—The digits recorded on 502 and 542 are 0 and 0 and there is a carry over coming from the preceding column.

Relays 502 and 542 are de-energized; according to the presence of carry over, current applied on terminal E comes by 532 from the preceding column, goes through relay 502 by blade 5022 off, through relay 542 by blade 5422 off and energises medium winding of upper relay 582 through lead 573. The result recorded on this column of register 580 is therefore 1 and the following column is fed, through rectifier 571, by lead 533 characterizing absence of carry over.

*3rd case.*—The digits recorded on 502 and 542 are 1 and 0 and there is no carry over coming from the preceding column.

Relay 502 is energised and relay 542 is de-energized; according to the absence of carry over, current applied on terminal E comes by 531 from the preceding column, goes through relay 502 by blade 5021 on, through relay 542 by blade 5422 off and energises medium winding of upper relay 582 through lead 573. The result recorded on this column of register 580 is therefore 1 and the following column is fed, through rectifier 571, by lead 533 characterizing absence of carry over.

*4th case.*—The digits recorded on 502 and 542 are 1 and 0 and there is a carry over coming from the preceding column.

Relay 502 is energised and relay 542 is de-energized; according to the presence of carry over, current applied on terminal E comes by 532 from the preceding column, goes through relay 502 by blade 5022 on through relay 542 by blade 5421 off and leaves the column by lead 534. Rectifier 572 prevents said current from energizing lower winding of upper relay 582 through lead 574. The result recorded on this column of register 580 is therefore 0 and the following column is fed by lead 534 characterizing presence of carry over.

*5th case.*—The digits recorded on 502 and 542 are 0 and 1 and there is no carry over coming from the preceding column.

Relay 502 is de-energized and relay 542 is energized; according to the absence of carry over, current applied on terminal E comes by 531 from the preceding column, goes through relay 502 by blade 5021 off, through relay 542 by blade 5423 on and energizes medium winding of upper relay 582 through lead 573. The result recorded on this column of register 580 is therefore 1 and the following column is fed, through rectifier 571, by lead 533 characterizing absence of carry over.

*6th case.*—The digits recorded on 502 and 542 are 0 and 1 and there is a carry over coming from the preceding column.

Relay 502 is de-energized and relay 542 is energized; according to the presence of carry over, current applied on terminal E comes by 532 from the preceding column, goes through relay 502 by blade 5022 off, through relay 542 by blade 5422 on and leaves the column by lead 534. Rectifier 572 prevents said current from energizing lower winding of upper relay 582 through lead 574. The result recorded on this column of register 580 is therefore 0 and the following column is fed by lead 534 characterizing presence of carry over.

*7th case.*—The digits recorded on 502 and 542 are 1 and 1 and there is no carry over coming from the preceding column.

Relays 502 and 542 are energized; according to the absence of carry over, current applied on terminal E comes by 531 from the preceding column, goes through relay 502 by blade 5021 on, through relay 542 by blade 5422 on and leaves the column by lead 534. Rectifier 572 prevents said current from energizing lower winding of upper relay 582 through lead 574. The result recorded on this column is therefore 0 and the following column is fed by lead 534 characterizing presence of carry over.

*8th case.*—The digits recorded on 502 and 542 are 1 and 1 and there is a carry over coming from the preceding column.

Relays 502 and 542 are energized; according to the presence of carry over, current applied on terminal E comes by 532 from the preceding column, goes through relay 502 by blade 5022 on, through relay 542 by blade 5421 on and energizes lower winding of upper relay 582 through lead 574. The result recorded on this column of register 580 is therefore 1 and the following column is fed, through rectifier 572, by lead 534 characterizing presence of carry over.

Now will be explained the action of commutator 701 of Fig. 7 when controlling operations in registers 500, 540 and 580 of Fig. 5.

Commutator 701 has three brushes 702, 703 and 704 connected to the positive terminal of the battery through working contacts 7051, 7052 and 7053 of relay 705. These three brushes rotate continuously in the direction of the arrow and wipe, in their rotation, three circular crowns 706, 707 and 708 having angular conductive sectors represented by hatched portions.

Binding post A being supplied with current and consequently relay 705 being energized, the three brushes 702, 703 and 704 will be supplied with current and impulses will be obtained on terminals B, C, D, E. Terminals B, C, D, E of Fig. 5 and Fig. 7 are interconnected.

Now, let us see what happens during a complete revolution of commutator 701.

1. When external brush 702 passes along the conductive sector 711 connected to F, a number is sent to relays 501 to 522 of the lower register 500 by binding posts $b_{13}$ to $b_{22}$ as heretofore assumed and as will be seen hereinafter.

2. When median brush 703 leaves conductive sector 710, current is suppressed on terminal C and consequently in the upper windings of relays 581 to 602, namely "memory" windings, which are connected, when these relays are energized, to the terminal C through blades 5812, 5822, 5832 ... 6012, 6022 in attracted position. We shall say that the "memory" is cut upon register 580.

3. When external brush 702 passes along the conductive sector 712 connected to E, the current causing the adding operation of the numbers recorded on the lower 500 and the medium 540 registers is sent and the sum appears on the upper register 580.

4. When median brush 703 wipes again conductive sector 710, current is sent to terminal C and consequently to the "memory windings" of the relays 581 to 602 which are energized. We shall say that the "memory" is given to register 580.

5. When internal brush 704 leaves conductive sector 709, current is suppressed on terminal D and consequently in the upper windings of relays 541 to 562, namely "memory" windings, which are connected, when these relays are energized, to the terminal D through blades 5414, 5424, 5434 ... 5614, 5624 in attracted position. We shall say that the "memory" is cut upon register 540.

6. When external brush 702 passes along the conductive sector 713 connected to B, the number recorded on the upper register 580 is transferred to the intermediate register 540, the lower windings of relays 541 to 562, corresponding to relays 581 to 602 energized, being fed through blades 5811, 5821, 5831 ... 6011, 6021 in attracted position. Simultaneously, brush 704 wipes again conductive sector 709 and "memory" is given back to register 540.

The number transferred to said medium register 540 is therefore fixed thereon.

The next revolution of commutator 701, if terminal A is still fed with current, will produce the same cycle as heretofore described; there is thus the possibility, with only three stages of relays, of obtaining the sum of any quantity of numbers applied successively on register 500.

The total being recorded at a given moment on the upper register may be fixed by feeding C permanently. Said result becomes available upon binding posts $e_1$ to $e_{22}$ through blades such as 5813, 5823, 5833 ... 6013, 6023. In fact, if relay 582 for example is energized permanently through terminal C, blade 5822 on and upper winding of relay 582, a positive current appears on binding post $e_2$ through positive pole of the battery, blade 6033 off, lead 575, blade 5823 on and binding post $e_2$.

In the case where a negative number is to be added, that is to say a subtraction is to be effected, the operation is as follows. To subtract a binary number from another binary number, it is just the same to add to the same number the complement to $2^n$ ($n$ being the capacity of the machine) of the number to subtract. Said complement is formed very simply by replacing all digits 1 by digits 0 and vice versa, and by adding 1. For example, the complement of the number 101110 is $$010001 + 1 = 010010$$

Let us assume, for a moment, that the capacity of the machine is six binary orders from 0 to 5 plus a sign, and that we will effect the two following subtractions:

(1)
```
60 − 46 =   0 1 1 1 1 0 0 − 0 1 0 1 1 1 0
        =   0 1 1 1 1 0 0 + 1 0 1 0 0 1 0
        = 1 0 0 0 1 1 1 0
``` the first digit at the left is not transmitted by the machine on account of its capacity, the second represents sign + and the others decimal number 14.

(2)
```
46 − 60 =   0 1 0 1 1 1 0 − 0 1 1 1 1 0 0
        =   0 1 0 1 1 1 0 + 1 0 0 0 1 0 0
        =   1 1 1 0 0 1 0
```

The first digit at the left signifies that:
The result is negative
All digits 1 must be replaced by digits 0 and vice versa in the result and 1 must be added. Thus, the result is:
```
        =   1 0 0 1 1 0 1 + 1
        =   1 0 0 1 1 1 0
        = − 14
```

If the number to be added is negative, this is translated into the machine by the arrival of current by one of the binding posts $l^s{}_c$ or $l^s{}_m$ of relay 84 (Fig. 5 or 6) which is then energized. Binding post $s$ being connected to the positive pole of the battery, all the upper windings of relays 501 to 522 and winding of relay 523 relative to the sign (or relays 610 to 632 and relay 633 relative to the sign) receive current. Since said windings action is opposite to the action of the lower windings, all the relays of lower register that are energized return to the de-energized position and vice versa. In the same manner, when the sign of the result is negative, relay 603 (or 703′) is energized and blade 6033 (or 7033′) on applies current on line 576 (or 676) instead of line 575 (or 675); thus, the digits of the result are inverted.

It will be seen hereinafter, with relation to Fig. 21, how, at the end of a series of operations there is added the numbers of units necessary to restore the exact result.

Figure 6:
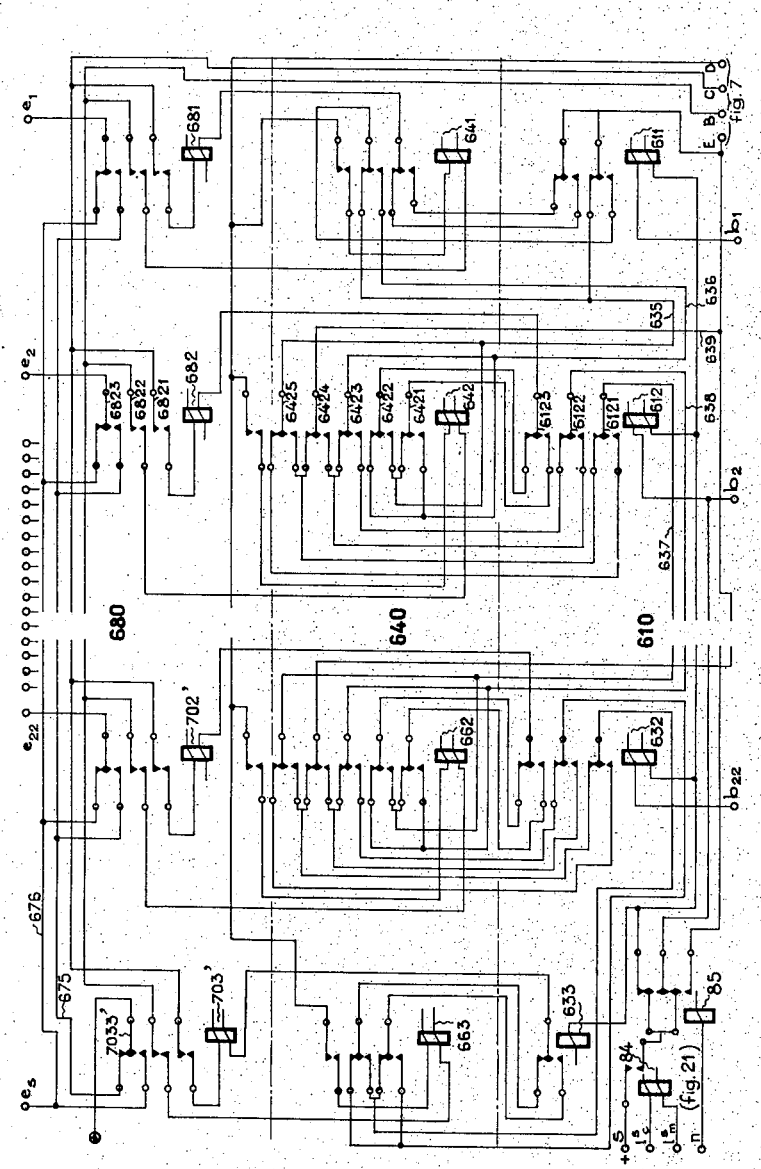

Fig. 6 represents a binary totalization apparatus that is different to that of Fig. 5, but controlled in the same manner by commutator 701 of Fig. 7.

The characteristic of this new binary totalizer is that the transmission of the carry overs of a binary order to another is effected at the same time for all the binary orders, this without introducing rectifiers in the circuits.

Hereinafter is described the mechanism of the addition of two numbers, for example on the second column of relays from the right which corresponds to the binary order 1 (second digit from the right of the binary numbers).

610, 640, 680 designate the relays of the lower, intermediate and upper registers.

On relay 612 is recorded the digit of binary order 1 corresponding to the first term of the sum.

On relay 642 is recorded the digit of the same binary order of the second term of the sum.

On relay 682, is to be recorded the digit of the same binary order of the sum.

*1st case.*—The digits recorded on 612 and 642 are 0 and 0 and there is no carry over coming from the preceding column.

Relays 612 and 642 are de-energized; current arrives by 635 from the preceding column.

The current coming from 635 cannot go anywhere. Path through blade 6425 off is open at blade 6121 off, and path through blade 6421 off is open at blade 6123 off.

The current coming from E follows path: lead 639, blade 6424 off, blade 6121 off and lead 637 characterizing absence of carry over. The desired result is therefore obtained: 0 on 680 and no carry over transmitted.

*2nd case.*—The digits recorded on 612 and 642 are 0 and 0 and there is a carry over coming from the preceding column.

Relays 612 and 642 are de-energized; current arrives by 636 from the preceding column.

The current coming from 636 goes through blade 6422 off, blade 6123 off and energizes lower winding of relay 682. Same current could go through blade 6423 off, but is stopped at blade 6122 off.

The current coming from E follows same path as in the first case and leaves the column by lead 637 characterizing absence of carry over. The desired result is therefore obtained: 1 on 680 and no carry over transmitted.

*3rd case.*—The digits recorded on 612 and 642 are 1 and 0 and there is no carry over coming from the preceding column.

Relay 612 is energised and relay 642 is de-energized; current arrives by 635 from the preceding column.

The current coming from 635 goes on the one hand through blade 6421 off, blade 6123 on and energizes lower winding of relay 682, and, on the other hand, through blade 6425 off, blade 6121 on and leaves the column by lead 637 characterizing absence of carry over.

Current coming from E goes through blade 6424 off and is stopped at blade 6121 on. The desired result is therefore obtained: 1 on 680 and no carry over transmitted.

*4th case.*—The digits recorded on 612 and 642 are 1 and 0 and there is a carry over coming from the preceding column.

Relay 612 is energized and relay 642 is de-energized. Current arrives by 636 from the preceding column.

The current coming from 636 goes on the one hand through blade 6423 off, blade 6122 on and leaves the column by lead 638 characterizing presence of carry over, and, on the other hand, through blade 6422 off but is stopped by blade 6123 on.

Current coming from E goes through blade 6424 off but is stopped by blade 6121 on. The desired result is therefore obtained: 0 on 680 and a carry over transmitted.

*5th case.*—The digits recorded on 612 and 642 are 0 and 1 and there is no carry over coming from the preceding column.

Relay 612 is de-energized and relay 642 is energized. Current arrives by 635 from the preceding column.

The current coming from 635 goes on the one hand through blade 6425 on, blade 6121 on and leaves the column by lead 637 characterizing absence of carry over and, on the other hand, through blade 6422 on, blade 6123 off and energizes lower winding of relay 682.

Current coming from E is stopped at blade 6122 off. The desired result is therefore obtained: 1 on 680 and no carry over transmitted.

*6th case.*—The digits recorded on 612 and 642 are 0 and 1 and there is a carry over coming from the preceding column.

Relay 612 is de-energized and relay 642 is energized. Current arrives by 636 from the preceding column.

The current coming from 636 goes on the one hand through blade 6423 on, blade 6122 off and leaves the column by lead 638 characterizing presence of carry over and, on the other hand, through blade 6422 which is open.

Current coming from E is stopped at blade 6122 off. The desired result is therefore obtained: 0 on 680 and a carry over transmitted.

*7th case.*—The digits recorded on 612 and 642 are 1 and 1 and there is no carry over coming from the preceding column.

Relays 612 and 642 are energized; current arrives by 635 from the preceding column.

The current coming from 635 goes on the one hand through blade 6425 on and is stopped at blade 6121 on and, on the other hand, through blade 6422 on and is stopped at blade 6123 on.

Current coming from E goes through blade 6424 on, blade 6122 on and leaves the column by lead 638 characterizing presence of a carry over. The desired result is therefore obtained: 0 on 680 and a carry over transmitted.

*8th case.*—The digits recorded on 612 and 642 are 1 and 1 and there is a carry over coming from the preceding column.

Relays 612 and 642 are energised; current arrives by 636 from the preceding column.

The current coming from 636 goes on the one hand through blade 6423 on and is stopped at blade 6122 on and, on the other hand, through blade 6421 on, blade 6123 on and energizes lower winding of relay 682.

Current coming from E goes through blade 6424 on, blade 6122 on and leaves the column by lead 638 characterizing presence of a carry over. The desired result is therefore obtained: 1 on 680 and a carry over transmitted.

The operation of the apparatus of Fig. 6 in combination with commutator 701 of Fig. 7 is the same as that of the apparatus of Fig. 5.

The commutator 701, in making a revolution, gives rise to the following actions:

1. When brush 702 passes along the terminal F, a number is sent to relays of the lower register by binding posts $b_1$, $b_2$, $b_3$, ... $b_{21}$, $b_{22}$ as has been assumed and as will be shown hereinafter.

2. When brush 703 leaves terminal 710, the "memory" of register 680 is cut.

3. When brush 702 passes along conductive sector 712, the addition is performed and the result transmitted on the upper register.

4. When brush 703 wipes again conductive sector 710, "memory" is restored to the upper register.

5. When brush 704 leaves conductive sector 709, the intermediate register is de-energized.

6. When brush 702 wipes conductive sector 713, the result of the sum is transferred from the upper register to the intermediate register.

*Translation of a decimal number in the binary base*

The recording of numbers in a binary base in number indicators $C_{jk}$ of the matrix and in number indicators $m_j$ of the multiplying column from decimal data, constitute an application of the totalizers which have just been described. Said recording is effected by the cooperation of three elements:

A decimal posting keyboard which performs the successive binary translation of the number of each decimal order of the data, i. e. first the binary translation of the number of decimal units, then the translation of the number of the tens of said decimal number, then the translation of the number of the hundreds, etc.

The binary totalizer heretofore described (Fig. 5 or 6) which sums up the preceding binary translations and delivers on its output terminals the total of said successive translations.

A positioning keyboard (Fig. 8) which directs the result stored on the output terminals of the totalizer towards the desired number indicator of the matrix or of the multiplying column.

The operator depresses to the limit the key of the positioning keyboard corresponding to the location in the matrix or in the multiplying column of the term which it is desired to record. Then he depresses to the limit on the posting keyboard the decimal number representing the value of said term, and, besides if said number is negative, the negative sign key of said posting keyboard (shown at 71 on Fig. 24). Finally a posting key marked "Aff" (Fig. 24) must be depressed and the recording proceeds automatically. At the termination of said recording the key "Aff" and the depressed posting keyboard keys are automatically released. The operator can then effect another recording and when accordingly another key of the positioning keyboard is depressed to the limit, the key of the keyboard previously depressed is freed to return to an intermediate position.

The recording of the decimal data proceeds as heretofore described and when said recording is terminated, a special key of the positioning keyboard is depressed, which has the effect of returning all the keys that have been depressed from their intermediate position to their original upper position.

Figure 8:
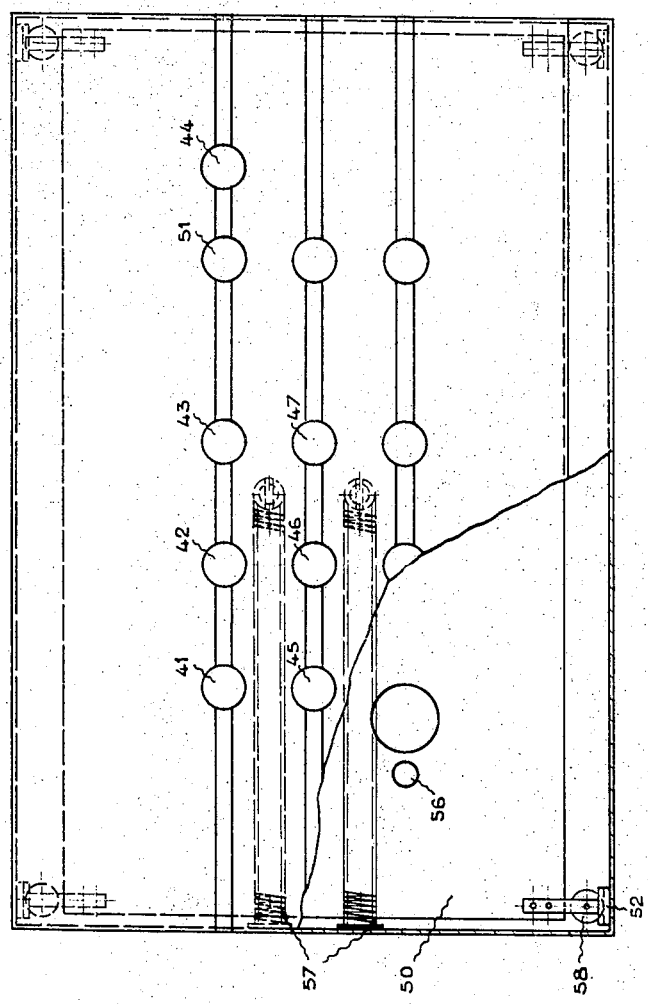

Fig. 8 represents the positioning keyboard. In said keyboard, key 41 corresponds to the element $a_{11}$ of the matrix, key 42 to the element $a_{12}$, key 43 to the element $a_{13}$, key 45 to the element $a_{21}$, key 46 to the element $a_{22}$, key 47 to the element $a_{23}$ of the matrix etc . . . , key 51 to the element $y_1$ of the multiplying column, etc.

The function of key 44 is the restoring of all keys to their initial position and also the erasure of all number indicators, as will be described hereinafter.

Fig. 9 represents keys 41, 42, 43, 51 and 44 of the positioning keyboard. Said keys can occupy three positions:

Key 41 is in the initial position (upper position);

Key 42 is in the operative position (lower position);

Key 43 is in the intermediate position, indicating that the corresponding element is already posted.

It is seen in Fig. 9 that a key when depressed (see key 42), secures the contact between contact points 39 and 40 of blades 48 and 49; all blades 49 are interconnected and terminate on a binding post $Q_1$ (Figs. 9 and 16). Blades 48 are connected to starting terminals $dc_{11}$, $dc_{12}$, $dc_{13}$ . . . of number indicators $C_{11}$, $C_{12}$, $C_{13}$ . . . Therefore the sending of an impulse to common binding post $Q_1$ will start the number indicator corresponding to the depressed key 42, i. e. number indicator $C_{12}$.

Rectangular plate 50, restorable by springs 57 and guided in each of its ends by rollers 58 movable in recesses 52, assures the maintenance of the keys in the aforementioned three positions. Each key compresses in its lower position a spring 53. The depressing of another key effects the restoring of the precedingly depressed key from its lower position to its intermediate position, due to projection 54 of the second key displacing plate 50 to the right and due to blade 55 hitting upwards said plate 50.

Several keys may be depressed simultaneously, in order to post several equal elements of the matrix or of the column matrix by means of a single composition of the posting keyboard.

When the data storage upon the number indicators is ended, the depression of key 44 disengages completely plate 50 on the right, thereby restoring all keys to the upper position and the push elements 56 of plate 50 secure simultaneously all the contacts between blades 48 and 49. Blade 48 associated with key 44 is permanently connected to the positive pole of the battery. While key 44 is depressed, $Q_1$ is fed with current which causes an idle revolution of all data number indicators of the machine, consequently an erasure of all the numbers that may be recorded thereon.

To resume the foregoing, the depression of a positioning keyboard key closes a contact of the feed circuit of the starting terminal of the number indicator corresponding to said key; said number indicator, when an impulse is sent to $Q_1$ at the end of the transformation "decimal-binary," will revolve, as will be shown hereinafter. When the positioning keyboard is restored to the rest position, by means of the depression of key 44, another impulse is sent to $Q_1$ by said key 44 and consequently all the number indicators of the matrix and of the multiplying column make an idle revolution, that is to say a revolution without feeding any terminal 29, said idle revolution causing a general erasure.

Figs. 10, 11, 12, 13, 14, 15a, 15b and 15c represent the posting keyboard. It comprises a casing 67 and a plurality of keys 61, 63 arranged in columns and rows. Each column relates to a decimal order, the first column from the right to the decimal units, the second to the decimal tens and the third to the decimal hundreds. Each row relates to a decimal digit, the first row from the bottom to digit 0 (the keys of this row are inoperative), the second to digit 1, the tenth to digit 9. Fig. 10 is a cross section of the keyboard by a plane parallel to a row and Fig. 12 is a cross section by a plane parallel to a column.

Operative keys of the keyboard, that is to say the keys corresponding to digits 1 to 9, are lengthened, by means of straps 59, by isolating plungers 60; the keys corresponding to digits 0 of the several decimal orders (first key from the left in Fig. 12) are not lengthened.

Plungers 60 are provided with conductive plate 66 and small conductive rods 64 pushed to the right (Figs. 13 and 14) by springs 65 bearing against conductive plate 66. Fig. 12 shows, by small circles 68, the location of rods 64 on plungers 60 relative to the unit column.

The different columns of keys are separated by insulating walls 69 provided with vertical grooves 99 and horizontal grooves 100. Grooves 99 constitute slideways for plungers 60. Conductive bars 62 are inserted in grooves 100 (Figs. 15a, 15b and 15c).

In inoperative position of keys 61, rods 64 are not in front of bars 62, whereas, in operative position, they have frictional contact with said bars. Lower bar 62 is a feed bar. If, for example, the tenth key of the unit column, designated by reference number 63 is depressed, lower rod 64 of the key-plunger makes contact with bottom feed bar 62, intermediate rod with the second bar from the bottom which corresponds to binary order one and the upper rod with the top bar which corresponds to binary order eight (Fig. 14). Consequently binary order eight bar and binary order one bar are fed from feed bar through conductive plate 66 and springs 65. Decimal digit 9 will be written 1001 which is its exact binary translation.

It is simple to check off on Fig. 12 from the location of circles 68 representing the plunger-rods and which also point out with the exception of a vertical translation, the levels of bars 62 fed with current that the conversion "decimal binary" is exact.

Five bars 62 are sufficient for the decimal units, there must be 7 for the decimal tens etc. Fig. 10 shows the arrangement of walls 69 separating the decimal columns of the keyboard. The number of bars 62 increases with the decimal order which they relate to, which explains the slant bottom of the keyboard shown in Fig. 10. All lower bars 62 are connected to the positive pole of a battery, other bars 62 are connected to the pins of selector 70 (Fig. 16).

Selector 70, in combination with the totalizer (Fig. 5 or 6), allows the successive totalling of the binary translations of the successive decimal orders of the data. If for example it is desired to translate 976 in the binary system, there is taken off:

On bars 62 relative to the decimal units:

6=110

On bars 62 relative to the decimal tens:

70=1000110

On bars 62 relative to the decimal hundreds:

900=1110000100 and there is added:

1110000100+1000110+111101000

Selector 70 and other selectors which will be seen afterwards are of the step-by-step type generally used in automatic telephone systems. Such selectors are for example disclosed in "Automatic Telephone Systems" by William Aitken, volume one, page 39, Fig. 36, Benn Brothers Limited, London. The number of columns and the number of levels or rows of these selectors are chosen according to the capacity designed for the machine and to their particular functions.

Selector 70 receives on its first column of pins 1601 the binary translation of the digit of decimal order zero of the posting keyboard, on its second column of pins 1602 the binary translation of the digit of decimal order one, etc.

It is assumed that selector 70 corresponds to the binary numbers of maximum ten digits that is to say, up to binary order nine, which corresponds to the capacity of the posting keyboard disclosed with relation to Fig. 11 which keyboard allows the possibility of posting decimal data of three digits maximum. Selector 70 is furnished with two service rows (first and second rows) and ten distribution rows. The brushes of selector 70 are connected (as shown in Fig. 16) to terminals $b_{13}$, $b_{14}$, $b_{15}$ . . . $b_{21}$, $b_{22}$ of one of the totalizers of Fig. 5 or 6, in order that the digit of the highest binary order (order nine) may be recorded on the order 22 column of the totalizer.

Let us assume that a number is posted on the posting keyboard and that its position in the matrix [M] or in the column matrix [Y] is determined by a positioning keyboard key, said key depressed to the limit (lower position) and let us refer to Figs. 5 or 6, 7, 16 and 24.

The depression of key "Aff" (Fig. 24) causes the closing and maintaining of three contacts:

Through blade 2601, lead 2609, blade 723, binding post A (Figs. 24 and 7) is connected to the positive pole of the battery;

Through blade 2602, binding post F (Fig. 7) is connected to binding post V (Fig. 16);

Through blade 2603 and movable contact of sign-key 71, terminal $e_s$ of Fig. 5 or 6 is connected to the positive pole of the battery.

Binding post A being fed with current, relay 705 is energised causing current to flow to brushes 703, 704, 705 of commutator 701 (Fig. 7). At each revolution of 701, selector 70 therefore advances one step. The totalizer will successively receive upon terminal $b_{13}$ to $b_{22}$ the translation in binary base of the number of each decimal order of the number posted on the posting keyboard.

In the preceding example the totalizer will receive:

110 on binding posts $b_{15}$ to $b_{13}$ when brushes 1621 to 1632 of selector 70 wipe the pins of column 1601

1000110 on binding posts $b_{19}$ to $b_{13}$ when brushes 1621 to 1632 of selector 70 wipe the pins of column 1602

1110000100 on binding posts $b_{22}$ to $b_{13}$ when brushes 1621 to 1632 of selector 70 wipe the pins of column 1603.

At the end of three revolutions of commutator 701, the brushes of selector 70 will have advanced three steps and the sum of the three binary translations posted on columns 1601, 1602, 1603 of said selector will be stored on binding posts $e_{12}$ to $e_{22}$ of the totalizer.

The fifth impulse sent to selector 70 by commutator 701 will connect the brush 1631 of said selector to the pin of the second row of column 1605, itself connected to terminal H (Figs. 16 and 24) controlling relay 72 (Fig. 24). Thus relay 72 is energised, blade 723 is attracted, binding post A and brushes 702, 703 and 704 are no longer supplied with current. Binding post C (Figs. 24 and 5 or 6) is fed with current by blade 722 on, which fixes the result on binding posts $e_{12}$ to $e_{22}$ of the totalizer, because relay 72 has been energised with memory through the circuit: pole + of the battery, blade 2741 of relay 274, at rest blade 741 of relay 74 at rest, blade 721 of working relay 72, upper winding of relay 72, pole — of the battery.

On column 1605 the step by step advancing brush 1632 of 70 is fed with current and the brushes pass to column 1606 where an impulse is sent to $Q_1$ (Fig. 9), which starts the number indicator designated by the positioning keyboard. In short, the sending of a binary number to be posted, to a given number indicator, is obtained by the following operations (example cited):

The brushes of selector 70 are on pins column 1601. The binary translation of the digit of the decimal units, for example 6, is sent to lower register 500 or 610 of the totalizer. Commutator 701 rotates and at the end of one revolution the binary number is fixed on intermediate register 540 or 640 of the totalizer, and selector 70 advances one step.

The brushes of selector 70 are on pins column 1602. The binary translation of the number of tens, for example 70, is sent to lower register 500 or 610 of the totalizer. Commutator 701 rotates causing the addition of the number of the lower register with the number of the intermediate register, the result being fixed on the intermediate register at the end of the revolution of 701. At the same moment selector 70 advances one step.

The same procedure is effected for the addition of the binary translation of the number of hundreds for example 900.

Selector 70 again advances one step and sends an impulse to relay 72 by binding post H (Figs. 16 and 24) which gives "memory" to the upper register of the totalizer whereon is stored the result and stops the functioning of said totalizer.

Terminals $e_{13}$ to $e_{22}$ of the totalizer (Fig. 5 or Fig. 6) are permanently connected to bus bars binding posts $e^{13}c_{jk}$ to $e^{22}c_{jk}$ or $e^{13}m_j$ to $e^{22}m_j$, feeding the input number indicators terminals. The number indicator designated at the positioning keyboard having started due to the sending of an impulse through $Q_1$ will record the binary number formed by the totalizer.

The sign of the number to record on the number indicator is designated by key 71 of Fig. 24 (key depressed if the sign is negative); if the sign is minus, a current is transmitted to bus bar connected to $e^s c_{jk}$ and $e^s m_j$ and when impulse current from $Q_1$ has started the number indicator designated at the positioning keyboard, the sign will also be recorded.

In Fig. 16 column 1607, selector 70 sends an impulse to binding post $d$ (Fig. 4 and Fig. 16). In the machine, there is a revolution counter comparable to number indicator $C_{jk}$, but without any contact to close, therefore without terminals. The function of said revolution counter represented schematically in Fig. 4 is to receive an impulse by starting binding post $d$, and to send an impulse by binding post $f$, slightly before the end of its rotation. Said revolution counter is driven by the same motor group as all the number indicators, but always at nine tenths of said number indicators' speed. It is therefore certain that between impulses $d$ and $f$, any number indicator will have had the time to make a revolution and record a binary number.

The functioning of selector 70 is as follows: The first four steps are controlled by the current coming through terminals F and V from commutator 701; the fifth and sixth by a step-by-step process. On column 1607 selector 70 sends an impulse through $d$ to the revolution counter and awaits the return impulse from $f$ of said revolution counter. Said impulse arriving causes selector 70 to make a new step, then the last steps are made by automatically controlled makebreaks, which restore selector 70 to its initial position, said selector 70 supplying current to binding posts X and I respectively while passing on columns 1608 and 1699.

Binding post X (Fig. 24) receives an impulse, which causes key "Aff" to be restored to its rest position and also the restoring to its initial position of the posting keyboard. Impulse from X energizes an electro-magnet, not shown in Figs. 10 to 15c the effect of which is to restore to their upper positions, by means of springs 101, the keys such as 61 or 63 that have been previously depressed.

The impulse sent to I (Figs. 16 and 24) energizes relay 74 (Fig. 24), opening at blade 741 the holding circuit of relay 72, thus de-energizing said relay 72. Thus, all the elements are restored to their initial positions, the totalizer being deprived of "memory" and of current feed.

The mechanism heretofore described renders it possible to post any number in any data number indicator of the matrix or of the multiplying column, said number being formed in the decimal system on a posting keyboard, positioned by the positioning keyboard and transformed automatically into a binary number.

*Translation of a binary number in the decimal system*

Before examining the calculation operations performed by the present machine there will hereinafter be described the device assuring the inverse function to that which has been immediately heretofore described, said inverse function being the conversion from the binary system into the decimal system. It is desired to transfer into the decimal system the numbers recorded in the number indicators $p_1$, $p_2$, $p_3$ in the binary system and to record the decimal results for example by photographing them.

Figure 18:
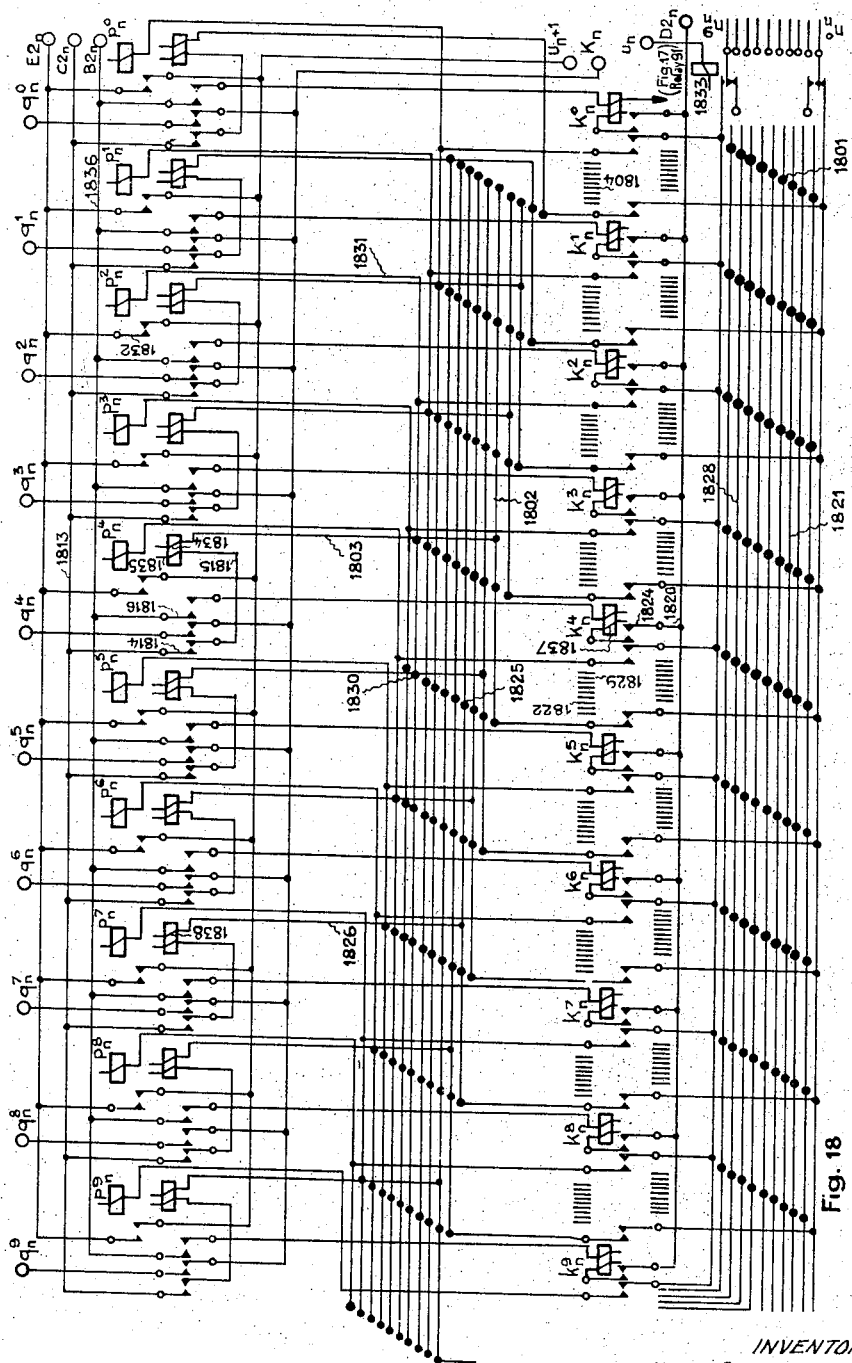

The mechanism effecting these operations comprises:

A group of two selectors, 75 and 76 (Fig. 17);

A decimal totalizer shown complete (7 decimal orders) in Fig. 19 and in detail for the decimal order $n$ in Fig. 18;

A panel of signalling lamps associated with a camera.

The 22 first pins from the left column 751 of selector 75 are connected to output terminals $l^1_{p1}$ to $l^{22}_{p1}$ of number indicator $p_1$, the 23rd pin of column 751 is connected to sign-output terminal $l^s_{p1}$ and the 24th pin is connected to transfer terminal $L_{p1}$. Pins of columns 752 and 753 are connected in the same manner to output terminals of number indicators $p_2$ and $p_3$.

Brushes 7501 to 7522 are connected to the 22 first pins of row 761 of selector 76. Brush 7523 which wipes the 23rd column reserved for the sign of the results stored on $p_1$, $p_2$, $p_3$ is connected to the 23rd pin of row 761 and brush 7524 is connected to the positive pole of the battery.

The pins of rows 762 to 768 of selector 76 are connected to seven groups of ten circuits, each group corresponding to a decimal order and each circuit of a group to a digit of said decimal order, this in assuming that the binary numbers to translate comprise seven digits maximum in the decimal base. $n^0_4$ to $n^9_4$ for example are ten wires representing the ten digits of the fourth decimal order. Let us assume that the number recorded on number indicator $p_1$ and consequently on row 761 of selector 76 is

100110010110 = 4,454

When brushes 7601 to 7608 arrive respectively on pins 7619, 7629, 7639 . . . 7689 which correspond to binary order nine therefore to the ninth from the right of the binary number to be translated, as the digit of this binary order in the assumed number is 1, a current is transmitted by brush 7601 to all the brushes 7602 to 7608 in parallel.

Thus following leads will be fed:

Group $n^0_7$ to $n^9_7$ corresponding to brush 7602 on pin 7629: $n^0_7$

Group $n^0_6$ to $n^9_6$ corresponding to brush 7603 on pin 7639: $n^0_6$

Group $n^0_5$ to $n^9_5$ corresponding to brush 7604 on pin 7649: $n^0_5$

Group $n^0_4$ to $n^9_4$ corresponding to brush 7605 on pin 7659: $n^0_4$

Group $n^0_3$ to $n^9_3$ corresponding to brush 7606 on pin 7669: $n^1_3$

Group $n^0_2$ to $n^9_2$ corresponding to brush 7607 on pin 7679: $n^2_2$

Group $n^0_1$ to $n^9_1$ corresponding to brush 7608 on pin 7689: $n^8_1$

There is translated:

10000000 (base 2) = 128 (base 10)

Therefore appears successively in the groups of circuits $n^0_1$ to $n^9_1$, $n^0_2$ to $n^9_2$ . . . $n^0_7$ to $n^9_7$ the decimal translation of each binary order. As the brushes of selector 76 advance step-by-step, a decimal totalizer shown in Figs. 18 and 19 totals the successive decimal translations.

Decimal totalizer of Fig. 19 comprises seven groups of two stages of relays controlled by commutator 77. Fig. 18 shows one of said groups of two stages of relays corresponding to the decimal order $n$. The operation of said totalizer is similar to that of totalizer in binary system shown in Figs. 5, 6 and 7. The sending of an impulse to binding post R (Figs. 19 and 24) of relay 78 energizes said relay with "memory," memory being given through: pole + of the battery, blade 931 off, lead 1991, blade 781 on, upper winding of relay 78, pole − of the battery. Relay 177 which feeds current unto brushes 771 to 773 of commutator 77 is then energized through: pole + of battery, blade 782 on, blade 781 off, lead 1992, winding of relay 177, pole − of the battery.

The currents coming from selector 76 arrive on lines $n^0_7$ to $n^9_7$, $n^0_6$ to $n^9_6$ . . . $n^0_1$ to $n^9_1$, on lines $n^0_n$ to $n^9_n$ for example, since addition relative to decimal order $n$ is concerned.

At its first step, selector 76, controlled by impulses through $F_2$ of commutator 77, sends a pulse coming from said commutator, through terminal $E_2$ and brush 7610, to relay 91 of Fig. 17. The energising of said relay effects the closing of blades $k^0_1$, $k^0_2$ . . . $k^0_7$, that is to say the posting of zeros on the corresponding relays of the left hand stage of the totalizer, one of which, relay $k^0{}_n$ is represented in Fig. 18 and is therefore energized.

Assuming that the digit transmitted, at decimal order $n$, by selector 76 is 4, this signifies that current arrives by line $n^4{}_n$. Said current goes through the following path: lead 1801, blade 1804 of relay $k^0{}_n$, leads 1802, 1803, lower left winding 1834 of relay $P^4{}_n$ which operates, all other relays $k$ being de-energized; this is obviously the only path possible. Relay $P^4{}_n$ closes with "memory," for, at this moment, commutator 77 is feeding terminal $C_{2n}$ through lead 1904 (Fig. 19) and lead 1813 (Fig. 18) and current applied on this terminal energizes upper left winding 1835 of $P^4{}_n$ through blade 1814 on, and lead 1815.

Relays $P_n$ are assumed as such that the energizing of at least one of the left hand windings causes only the closing of the left hand contacts and the energizing of the right hand winding causes the closing of all the contacts.

Commutator 77 sending a pulse through $B_{2n}$ energises relay $k^4{}_n$ through lead 1905 (Fig. 19), lead 1836 (Fig. 18), blade 1816 on, said relay $k^4{}_n$ closing with "memory," terminal $D_{2n}$ being fed by commutator 77. The path of the holding current of $k^4{}_n$ is: terminal $D_2$ (Fig. 19), lead 1906 (Fig. 19), terminal $D_{2n}$ (Fig. 18), lead 1829, blade 1824 on, upper winding 1837 of $k^4{}_n$.

At this moment, commutator 77 sends a pulse through $F_2$ and causes selector 76 to advance one step, the effect being to send to the totalizer the following number. Let us assume that the digit 3 is then sent to the decimal order $n$. Current arrives by line $n^3{}_n$ and goes through the following path: lead 1821, blade 1822 on, leads 1825, 1826, lower left winding 1838 of $P^7{}_n$ which operates with "memory" like relay $P^4{}_n$ in the former step of selector 76. Current through $B_{2n}$ energizes $k^7{}_n$ through the blades of which will pass the next current sent by selector 76 on lines $n^0{}_n$ to $n^9{}_n$.

If, instead of digit 3, selector 76 had sent, as second digit, digit 8, the relay energized through blades of $k^4{}_n$ would have been $P^2{}_n$ through lead 1828, blade 1829 on, leads 1830, 1831. All the contacts of said relay would thereby be closed. There would be therefore digit 2 recorded on the right hand stage of the totalizer of Fig. 18, said digit to be transferred to the left hand stage into $k^2{}_n$; but, in addition, the pulse from $E_{2n}$ will be sent through the right hand contact 1832 of $P^2{}_n$ to binding post $u_{n+1}$. Said binding post energizes a relay of decimal order $n+1$ not shown having the same function as the relay 1833 controlled by binding post $u_{n-1}$ of Fig. 18 for the order $n$. The object of these relays is to displace by one row, as represented in Fig. 18, the currents arriving by lines $n^0{}_n$ to $n^9{}_n$, therefore to add a carry over.

When the digit of a given binary order of the number stored upon a row of 75 is zero, lead 7814 is not fed with current, relay 92 of Fig. 17 is at rest and a decimal number constituted by zeros is sent on terminals $n^0{}_n$, $n^0{}_2$, $n^0{}_7$ by current coming from $E_2$.

After having passed over the active columns, selector 76 brought by pulse from $F_2$ to the column corresponding to the pin connected to terminal J (Figs. 17 and 19). Brush 7609 sends to this terminal a pulse which energizes with "memory" relay 79 of Fig. 19 which opens at blade 791 on the feed circuit of relay 177 and consequently the current feed of brushes 771, 772, 773. Simultaneously the current from $C_2$ is permanently maintained through blade 793 on of relay 79 and leads 1907 and 1903 and consequently the result is fixed on the right hand stage (relay $P^0{}_n$ to $P^9{}_n$) of the totalizer of Fig. 18 for the decimal order $n$ and in general on the right hand parts of stages 1951 to 1957 of the complete totalizer of Fig. 19.

Selector 76 continuing its make-break movement feeds current to binding post K (Figs. 17 and 19) and consequently to binding posts $K_1$, $K_2$, ... $K_7$. The arrival of an impulse on $K_n$ of Fig. 18 transmits current by one of the binding posts $q^0{}_n$ to $q^9{}_n$ corresponding to that of the relays $P_n$ which is energized.

Selector 76 continuing to advance by make-break steps, its brush 7609 passes over pin 7612 connected to winding 758 of the relay effecting the step by step advancing of selector 75, which advances one step. Brush 7609 then passes over pin 7612 connected to binding post $M_1$ which is the trigger terminal of the photographic means hereinafter described and then over pin 7613 connected to terminal L which, by energizing relay 160 of Fig. 19, restores relay 79 to its de-energized position by opening its "memory" at blade 1611.

There is thus successively translated in binary base and photographed all the numbers recorded on number indicators $p_1$, $p_2$, $p_3$.

Selector 75 (Fig. 17) reaches column 754 and returns to its rest position by make-break, feeding en route current to S, which energizes relay 93 of Fig. 19, thereby opening at blade 931 "memory" of 78 and the current feed of commutator 77. The decimal totalizer therefore ceases to function. Relay 131 of Fig. 19 is connected to binding post 756 of commutator 75. The sign therefore appears on binding post $q_s$ at the arrival of current in K.

Figs. 20a and 20b represent the optic and photographic means employed in the present invention, for registering the decimal results obtained.

161, 162, 163 designate the signalling lamps mounted on panel 80 by columns and rows, each column 2010 to 2017 corresponding to a decimal order and each row 2000 to 2009 a decimal digit.

A lamp 161 located at the intersection of the $n$th column and of the $j$th row is fed with current by wire $q^j{}_n$ of Figs. 18 or 19. For example, lamp 162 at intersection of column 2013 and row 2008 represents thousand digit 8 and is connected to terminal $q^8{}_4$ of Fig. 19.

At the end of the run of selector 76, the sending of current through K causes the lighting of the lamps which denote the result. Lamp 163 denoting the sign is fed with current by terminal $q_s$ of Fig. 19.

At the lighting instant, the lamp panel is photographed on film 81 (Fig. 20b) by means of camera 82. Current through binding post $M_1$ connected to pin 7612 of selector 76 energizes relay 883 and, by means of pawl 884 and ratchet wheel 885 causes the advance of film 81 one step after the photograph has been effected. The nonfunctioning of the relays or selectors results in an absence of digits, this because zero is a nonpreferential digit in the decimal system. Without exceeding the limits of the present invention binding posts $q^0{}_1$, $q^1{}_1$, $q^2{}_1$ ... $q^9{}_1$, $q^0{}_2$, $q^1{}_2$ ... $q^0{}_7$, $q^1{}_7$ ... $q^9{}_7$ could control the punches of a perforator if it is desired to employ the present invention as a computer in the known technic of perforated cards.

Multiplication device

The multiplication device is represented in Fig. 21.

It comprises essentially a diagonally wired selector 83, a multiplicand selector 95 and a multiplier selector 96.

The first ten pins of column 951 of selector 95 are respectively connected to terminals $l^1{}_{c_{11}}$ to $l^{10}{}_{c_{11}}$ of number indicator $C_{11}$, the eleventh pin of column 951 is connected to terminal $l^s{}_{c_{11}}$ and the twelfth pin of column 951 is connected to transfer terminal $L_{c_{11}}$. The pins of columns 952 to 959 of selector 95 are, in the same manner, respectively connected to the terminals of number indicators $C_{12}$, $C_{13}$, $C_{21}$, $C_{22}$, $C_{23}$, $C_{31}$, $C_{32}$, $C_{33}$.

The thirteenth pins of columns 953, 956, 959 are respectively connected to starting terminals $d_{p1}$, $d_{p2}$, $d_{p3}$ of number indicators $p_1$, $p_2$, $p_3$.

Brushes 9501 to 9510 wipe the selector rows on the pins of which are posted the successive multicands $$a^1{}_1\ a^2{}_1\ a^3{}_1\ a^1{}_2\ a^2{}_2\ a^3{}_2\ a^1{}_3\ a^2{}_3\ a^3{}_3$$

Brush 9511 wipers over the sign row and is connected to binding post $l^s{}_c$.

Brush 9512 wipes over the transfer row and is connected to binding post Q.

Brush 9513 is a starting brush for product storage number indicators $p_1\ p_2\ p_3$ and is connected to lead 853.

Brush 9514 is permanently connected to the positive pole of the battery.

Brush 9515 is the step-by-step advance brush connected to magnet motor winding 950 and to binding post $R_2$.

The first ten pins of column 961 of selector 96 are respectively connected to terminals $l^1{}_{m_1}$ to $l^{10}{}_{m_1}$ of number indicator $m_1$, the eleventh pin of column 961 is connected to terminal $l^s{}_{m_1}$ and the twelfth pin of column 961 is connected to transfer terminal $L_{m_1}$. The pins of columns 962 and 963 of selector 95 are, in the same manner, respectively connected to the terminals of number indicators $m_2$ and $m_3$.

Brushes 9601 to 9610 wipe the selector rows on the pins of which are posted the successive multipliers $y_1\ y_2\ y_3$.

Brush 9611 wipes over the sign row and is connected to binding post $l^s{}_m$.

Brush 9612 wipes over the transfer row and is permanently connected to the positive pole of the battery.

Brush 9613 is the step-by-step advance brush connected to magnet motor winding 960 and to lead 852.

Selector 83 is diagonally wired as represented on Fig. 21 and the diagonal wires are connected to input terminals $b_1$ to $b_{19}$ of the totalizer.

Brush 8300 is the step-by-step advance brush.

Brushes 8301 to 8310 are respectively connected to brushes 9501 to 9510.

Brush 8311 is connected to binding post P, brushes 8312 and 8313 are permanently connected to the positive pole of the battery. Lastly the first pin from the left of column 840 is connected to binding post $R_2$.

Multiplication of two numbers

Binding posts P and Q of Fig. 21 are assumed to be connected. Then brush 8311 of selector 83 is connected to brush 9512 of selector 95. Selector 95 is assumed to be on column 951.

When brushes 8300 to 8313 of selector 83 reach column 841 the third pin of which is connected to brush 9601 of selector 96, said brush 9601 being wiping over the pin of column 961 connected to $l^1{}_{m_1}$, if $l^1{}_{m_1}$ is fed with current, that is to say if 1 is the digit of binary order zero of the multiplier, a current is transmitted from $l^1{}_{m_1}$ to $L_{c_{11}}$, through brushes 9601, 8311, 9512. The currents representing the multiplicand digits appear on the first ten pins from the right of column 951 and therefore on brushes 9501 to 9510 of selector 95, then on brushes 8301 to 8310 of selector 83. As these brushes are then wiping the pins of column 841, said currents, according to the diagonal wiring of selector 83, are transmitted to input terminals $b_1$ to $b_{10}$ of the totalizer (Figs. 5 or 6).

Selector 83 making a step by means which will be explained hereinafter, its brushes 8300 to 8313 reach column 842 the third pin of which is connected to brush 9602 of selector 96, said brush 9602 being wiping over the pin of column 961 connected to $l^2{}_{m_1}$. If $l^2{}_{m_1}$ is fed with current, that is to say if 1 is the digit of binary order one of the multiplier, a current is transmitted from $l^2{}_{m_1}$ to $L_{c_{11}}$, through brushes 9602, 8311, 9512. Then the currents representing the multiplicand digits appear again on the first ten pins of column 951 wherefrom they are transmitted to the first ten pins from the right of column 842 and according to the diagonal wiring of selector 83, to input terminals $b_2$ to $b_{11}$ of the totalizer.

At each step of selector 83 and if the multiplier digit of the binary order corresponding to that step is 1 the multiplicand will be repeated, displaced each time by one binary order similarly to a multiplication in arithmetic. If the pace of selector 83 is synchronized with the pace of the totalizer, that is to say if the control advance terminal G of 83 is fed with the impulses coming from binding post F of commutator 701 (Fig. 7), the successive numbers appearing on terminals $b_1$ to $b_{10}$, $b_2$ to $b_{11}$, $b_3$ to $b_{12}$, ... will be summed up in the totalizer and the product of the numbers stored on $C_{11}$ and $m_1$ will be obtained on the upper register of said totalizer.

Multiplication of signs

Binding posts $s$., $l^s{}_c$, $l^s{}_m$, $n$, and relays 85 and 84 are shown at the bottom left of Fig. 5 or 6 and on Fig. 21 and selector 83 is shown in Fig. 21. It has already been stated heretofore that to multiply a negative number by a positive number, or the contrary, it is only necessary to inverse all the partial products (replace the digits 1 by the digits 0) and to add finally a number equal to the number of operations: for example, the multiplication of 101 (5) by −011 (−3) is the following:

```
          101
          011
     ─────────
       000101    inversed    1111010
       001010                1110101
       000000                1111111
     ─────────              ─────────
       001111                1101110
              3 operations        11
                             ─────────
                              1110001
```

The six last digits represent the result, the first indicates that it is inversed; the result is therefore −(001110+1) therefore −15. The 1 added corresponds to the inversion operation. Relays 84 and 85 effect this operation. Relay 84 is differential; its two windings are traversed by current inversely; for example if the number stored upon a matrix data number indicator is negative $I^s{}_c$ is under current, and if the number stored upon a column-matrix data number indicator is negative, $I^s{}_m$ is under current; therefore the rule of the multiplication of signs is:

$(+) \times (+)$ relay 84 de-energized : sign $+$
$(-) \times (-)$ relay 84 de-energized : sign $+$
$(+) \times (-)$ relay 84 energized : sign $-$
$(-) \times (-)$ relay 84 energized : sign $-$ Relay 84 energized signifies that if terminal $s$ is fed with current, all the secondary windings of the lower register of relays of the totalizer will be under current. As they are traversed inversely in their primary windings, if the first winding operate, the relay stays de-energised and vice versa; there is therefore transformed the digits 1 into 0 and the digits 0 into 1. It is seen that on selector 83 current through $s$ will be sent at the same moment as the numbers on binding post $b_1$ to $b_{19}$, due to the second row of pins of said selector. As the operation is repeated ten times, there must be added 10 in the decimal base, that is to say 1010 in the binary base this being performed by relay 85 fed with current by binding post $n$.

*Calculation of an algebraic sum of products and multiplication of a matrix by a column matrix*

Assuming that the matrix data have been posted on number indicators $C_{11}$, $C_{12}$, $C_{13}$, $C_{21}$, $C_{22}$, $C_{23}$, $C_{31}$, $C_{32}$, $C_{33}$ and that the column matrix data have been posted on number indicators $m_1$, $m_2$, $m_3$, the operation of multiplication matrix-column matrix is represented in Figs. 21 and 24.

The key referred "Mult" (Fig. 24) is depressed and locked. Said key closes permanently four contacts.

Blade 2611 connects through lead 2609 and blade 723 on the positive pole of the battery to binding post A (Figs. 7 and 24).

Blade 2612 connects binding post F of commutator 701 (Fig. 7) to binding post G of step by step advance of commutator 83.

Blade 2613 connects binding post P to binding post Q.

Blade 2614 connects binding post $R_1$ to binding post $R_2$.

Magnet motor 830 of selector 85 receiving by binding post G the successive impulses sent by F of 701 (Fig. 7), said selector advances step by step. On its first column 840, brush 8313 connected to the positive pole of the battery feeds with current binding post $R_1$ connected to step-by-step advance binding post $R_2$ of selector 95. Brushes 9501 to 9515 of selector 95 make contact with the pins of column 951.

Selector 83, continuing its step-by-step advance, under the control of computator 701, arrives on its second column 841 where the multiplication commences. Thus is effected the multiplication $a_{11}y_1$, taking account of the sign, as has been heretofore described in relation to the multiplication of a number by a number.

Arriving on column 852, brush 8313 of 83 sends, through lead 855 an impulse to the magnet motor 960 of selector 96. Brushes 9601 to 9613 of selector 96 then come in front of column 962 connected to number indicator $m_2$. Then selector 83, returning to its initial position, starts another cycle. Brush 8313 on column 840 sends an impulse to magnet motor of 95, causing the brushes of said selector to pass over column 952 the pins of which are connected to number indicator $C_{12}$. Thus is effected the multiplication $a_{12}y_2$.

Arriving on column 852, brush 8313 of 83 sends, through lead 855 an impulse to the magnet motor 960 of selector 96. Brushes 9601 to 9613 of selector 96 then come in front of column 963 connected to number indicator $m_3$. Then selector 83, returning to its initial position, starts a third cycle. Brush 8313 on column 840 sends an impulse to magnet motor of 95 causing the brushes of said selector to pass over column 953 the pins of which are connected to number indicator $C_{13}$. Thus is effected the multiplication $a_{13}y_3$.

At this moment, there is stored on the upper register of the totalizer the algebraic sum:

$$a_{11}y_1 + a_{12}y_2 + a_{13}y_3$$

At the end of the multiplication $a_{13}y_3$, selector 83, on column 852, causes selector 96 to pass to column 964. On this column, brush 9612 connected to positive terminal of the battery feeds the pin of column 964 connected to binding post H.

Current through binding post H energizes relay 72 (Fig. 24) which cuts, at break contact 723 energising current of relay 705 (Fig. 7) and consequently the feed current of brushes 702, 703, 704. Permanent current is applied to terminal C through blades 722, thus giving "memory" to the relays of the upper register of the totalisator. The product obtained is therefore stored on relays 581 and sq. of Fig. 5 or 681 and sq. of Fig. 6.

Selector 96 makes a make-break step from column 964 to column 965 where current is sent, through the pin of column 965 wiped by brush 9612 and lead 853, to brush 9513 of selector 95 which is now on column 953. A current is sent by said brush to terminal $d_{p_1}$; consequently number indicator $p_1$, input terminals $e^1{}_{p_1}$ to $e^{22}{}_{p_1}$ and $e^s{}_{p_1}$ of which are permanently connected to output terminals $e_1$ to $e_{22}$ and $e_s$ of the totalizer, makes a revolution and stores the product $$a_{11}y_1 + a_{12}y_2 + a_{13}y_3$$

Selector 96 arrives, by make-break step, on column 966, where brush 9612 sends an impulse, through terminal $d$, to the revolution counter, and awaits for re-starting the return impulse sent, through terminal $f$, by the revolution counter at the end of its rotation.

Selector 96 returns by make-break to its initial position and brush 9612 passing over column 967 sends a current to binding post I which energizes relay 74, thus cutting the "memory" of 72 which de-energizes and the cycle recommences, that is to say there will be stored $$a_{21}y_1 + a_{22}y_2 + a_{23}y_3$$

on number indicator $p_2$ and $$a_{31}y_1 + a_{32}y_2 + a_{33}y_3$$

on number indicator $p_3$.

Brush 9612 on column 969 sends a current, through lead 854 to the first pin from the left of the column 959 of selector 95 connected to number indicator $C_{33}$. 95 makes a step and returns by make-break to its initial position feeding current en route to binding post Y. Fig. 24 shows that Y is connected on the one hand to the electro-magnet winding liberating key "Mult" which is released and on the other hand to relay 143. Said relay energizes and sends a current through binding post R which is the triggering binding post of the binary decimal converter.

The products stored upon number indicators $p_1$ $p_2$ $p_3$ are then translated in decimal base and photographed by camera 82.

It is obvious that the scope of the invention is not limited to the specific embodiments described and that the invention may be employed in arrangements other than those given by way of example.

We claim:

1. A calculating machine adapted to multiply a matrix by a column matrix and comprising a first plurality of relay devices for storing and sending binary data signals representing the terms of the matrix, a second plurality of relay devices for storing and sending binary data signals representing the terms of the column matrix, a third plurality of relay devices for storing and sending binary product signals representing the terms of the product column, said devices comprising input storage terminals, each terminal corresponding to a binary order, means for starting the storage operation, output sending terminals each terminal corresponding to a binary order, and means for gating the sending operation, a binary multiplier circuit composed of two rotative selectors provided with pins, columns, and brushes, the pins of each column of the first selector being connected to the output terminals of a matrix data storing and sending device and the pins of each column of the second selector being connected to the output terminals of a column-matrix data storing and sending device, and of a diagonally wired selector provided with pins, columns, and brushes, said pins columns being reserved for the storing of the successive product signals of a matrix datum number by the binary digits of a column matrix datum number and said brushes being connected with the brushes of the first selector in order to transfer successively on the pins columns of the diagonally wired selector the currents existing on the pins columns of the first selector, means within the second selector for controlling said transfer according as the successive column matrix datum number digits are one or zero, a binary totalizer having input terminals, each corresponding to a binary order, connected to the diagonal wires of the multiplier circuit in such a way that the aforementioned successive product signals are sent to the totalizer input terminals with one binary order shift, and output terminals, each corresponding to a binary order, connected to the input terminals of a product column storing and sending device.

2. In a calculating machine of the type described a device for the storing and sending of algebraic binary number signals comprising in combination a metallic crown permanently supplied with current and plurality of input conductive terminals equal in number to the component binary digits of the numbers to be stored plus two terminals, one provided for the sign and the other for the starting of the device, the crown together with an input terminal constituting the input storing circuit of a binary digit or of the sign, a plurality of electric contacts each composed of three conductive blades, one stationary, the second movable, the third movable and comprising an armature and a stud adapted to cause when operated the contact between the two others, and of a locking device, all the stationary blades being connected to each other and the movable blades being connected to output circuits, a rotatable equipment comprising a clutch device operated by current from the starting terminal, an electromagnet and two brushes connected to the extremities of the winding of said electromagnet, one of which is wiping the input conductive terminals, said electromagnet passing successively before the armatures of the third movable blades and closing the contacts between the first stationary blades and the second movable blades and locking them when its winding is fed with current by the corresponding input terminal.

3. A device for the summing of binary numbers comprising in combination a plurality of electromechanical relays, energized or not as they store binary digit signal one or binary digit signal zero, arranged in three horizontal registers and in a plurality of columns, each column corresponding to a binary order of the component digits of the binary numbers, the lower register being reserved for the entrance of the successive terms of the sum and being composed of lower relays provided with winding terminals connected to the outputs of binary numbers storing and sending devices and with two contact input terminals, the intermediate register being reserved for the temporary storage of signals representing the sum and being composed of intermediate relays provided with two windings, the first of which is a holding winding and the second a transfer winding connected to make blades of the upper relays, and with four contact output terminals, the upper register being reserved for the recording of the signals representing the sum and being composed of upper relays provided with three windings the first of which is a holding winding, the second is connected to one of the four output terminals of the intermediate relay and the third to another terminal of said four output terminals, an inter-column wiring composed of two conductors connecting two of the four aforementioned output terminals of the intermediate relay to the two contact input terminals of the lower relay, and column wirings connected by means of an inter-column conductor to an upper relay in the upper register, said column wirings thereby adapted to energize the upper register relay of a given column when current enters the column through an inter-column conductor characterising absence of carry-over and if at least one among the lower and intermediate relays is energized or, on the contrary, when, current entering through the inter-wiring conductor characterising presence of carry-over, none or the two lower and intermediate relays are energized.

References Cited in the file of this patent

UNITED STATES PATENTS

| Number | Name | Date |
|---|---|---|
| 1,987,322 | Campbell | Jan. 8, 1935 |
| 2,275,396 | Johnson | Mar. 3, 1942 |
| 2,318,591 | Couffignal | May 11, 1943 |
| 2,364,540 | Luhn | Dec. 5, 1944 |
| 2,386,763 | Williams | Oct. 16, 1945 |

FOREIGN PATENTS

| Number | Country | Date |
|---|---|---|
| 577,893 | Great Britain | June 5, 1946 |